(12) United States Patent
Situ et al.

(10) Patent No.: US 12,474,360 B2
(45) Date of Patent: Nov. 18, 2025

(54) SAMPLE TUBE DECAPPER

(71) Applicant: Beckman Coulter, Inc., Brea, CA (US)

(72) Inventors: Richard L. Situ, Placentia, CA (US); Michael Calabrese, Brea, CA (US)

(73) Assignee: Beckman Coulter, Inc., Brea, CA (US)

( * ) Notice: Subject to any disclaimer, the term of this patent is extended or adjusted under 35 U.S.C. 154(b) by 872 days.

(21) Appl. No.: 17/730,591

(22) Filed: Apr. 27, 2022

(65) Prior Publication Data

US 2022/0252629 A1 Aug. 11, 2022

Related U.S. Application Data

(63) Continuation of application No. PCT/US2020/057652, filed on Oct. 28, 2020.
(Continued)

(51) Int. Cl.
*G01N 35/04* (2006.01)
*G01N 35/00* (2006.01)

(52) U.S. Cl.
CPC .......... *G01N 35/04* (2013.01); *G01N 35/0099* (2013.01); *G01N 2035/0405* (2013.01)

(58) Field of Classification Search
CPC ............... G01N 35/04; G01N 35/0099; G01N 2035/0405; B01L 3/50825; B01L 2300/042; B01L 9/06; B67B 7/02
See application file for complete search history.

(56) References Cited

U.S. PATENT DOCUMENTS

| 4,519,276 A | 5/1985 | Grabarski et al. |
| 5,095,681 A * | 3/1992 | Choi ................ B67B 3/22 53/367 |

(Continued)

FOREIGN PATENT DOCUMENTS

| CN | 104108671 A | 10/2014 |
| CN | 104787712 A | 7/2015 |

(Continued)

OTHER PUBLICATIONS

International Search Report and Written Opinion for Application No. PCT/US20/57652 filed on Oct. 28, 2020, 12 pages.
(Continued)

*Primary Examiner* — Benjamin R Whatley
*Assistant Examiner* — Curtis A Thompson
(74) *Attorney, Agent, or Firm* — FROST BROWN TODD LLP

(57) ABSTRACT

A decapping device may be integrated with an automated biochemical analyzer or biological testing system to aid in sample testing. The exemplary decapper, includes a motor that is operable to lower a latch mechanism to engage with a cap of a sample tube and then raise the latch mechanism to remove the engaged cap. As the latch mechanism is lowered, a retractor portion also descends and causes a set of grippers to extend and grip the sample tube. As the latch mechanism is raised, the set of grippers apply a corresponding pressure to hold the sample tube in place while the cap is removed. Once removed, the cap rests within the latch mechanism and the set of grippers are retracted by the raising retractor. As the latch mechanism returns to its origin position, an ejector arm is operated causing the cap to be ejected from the latch mechanism.

23 Claims, 17 Drawing Sheets

Related U.S. Application Data

(60) Provisional application No. 62/927,216, filed on Oct. 29, 2019.

(56) References Cited

U.S. PATENT DOCUMENTS

| | | | |
|---|---|---|---|
| 6,257,091 B1* | 7/2001 | Cohen | B67B 7/182 81/3.39 |
| 9,199,755 B1* | 12/2015 | Cohen | B67B 7/02 |
| 2003/0079567 A1 | 5/2003 | DuBois et al. | |
| 2005/0047966 A1* | 3/2005 | Itoh | G01N 35/0099 422/547 |
| 2005/0210671 A1* | 9/2005 | Itoh | B67B 7/02 29/700 |
| 2006/0104862 A1* | 5/2006 | Pages Pinyol | G01N 35/025 422/64 |
| 2008/0022808 A1 | 1/2008 | Stephen et al. | |
| 2010/0043211 A1 | 2/2010 | Pedrazzini | |
| 2011/0088517 A1 | 4/2011 | Tsujimura | |
| 2018/0292424 A1* | 10/2018 | Arnold | G01N 35/04 |
| 2019/0039869 A1 | 2/2019 | Strzempek et al. | |
| 2019/0041302 A1 | 2/2019 | Hunt et al. | |
| 2020/0209270 A1* | 7/2020 | Kaeppeli | G01N 35/04 |

FOREIGN PATENT DOCUMENTS

| | | | |
|---|---|---|---|
| CN | 107512690 A | 12/2017 | |
| EP | 0487492 A1 | 5/1992 | |
| EP | 2091650 B1 | 9/2011 | |
| JP | H02298015 A * | 12/1990 | H01G 13/00 |

OTHER PUBLICATIONS

European Search Report for European Patent Appl. No. 20883489.5, 10 sheets, (2023).

Chinese Office Action with Search Report for CN 202080075809.4 mailed Mar. 29, 2024, 16 pages.

* cited by examiner

SAMPLE TUBE DECAPPER

CROSS-REFERENCE TO RELATED APPLICATION

This application is a continuation of International Patent App. No. PCT/US2020/057652, entitled "Sample Tube Decapper." filed on Oct. 28, 2020, which is itself related to, and claims priority to U.S. Provisional Patent App. No. 62/927,216, entitled "Sample Tube Decapper," filed Oct. 29, 2019, the disclosures of which are incorporated by reference herein.

BACKGROUND

Various types of tests related to patient diagnosis and therapy can be performed by analysis of patient samples. This could include analysis of the patient's microorganisms, or "microbes," as well as analysis of samples to determine chemistry, antigen, antibodies, blood cell count, and other factors that may influence patient health. Microbes are microscopic living organisms such as bacteria, fungi, or viruses, which may be single-celled or multicellular. When analyzing microbes, biological samples containing the patient's microorganisms may be taken from a patient's infections, bodily fluids, or abscesses and may be placed in test panels or arrays, combined with various reagents, incubated, and analyzed to aid in treatment of the patient. Analysis of patient chemistry, immunoassay, blood cell count, and other characteristics may be similarly performed. For these varying analyses, automated biochemical analyzers or biological testing systems have been developed to meet the needs of health care facilities and other institutions to facilitate analysis of patient samples and to improve the accuracy and reliability of results when compared to analysis using manual operations and aid in determining effectiveness of various antimicrobials.

Biological samples are commonly contained within capped sample tubes. In order to access the biological sample for analysis or testing, the cap must be cut, punctured, removed, manually detached, or otherwise breached. In order to save time and resources, it may be beneficial to automate this process; however, such automation often has limitations. For example, automated cutting or puncturing processes often require additional cleaning operations to wash the blade, needle, and/or probe that is used to breach the cap. Likewise, automated cap removal processes may have high degrees of system complexity and are often unable to accommodate multiple sample tube heights in a given rack of sample tubes.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
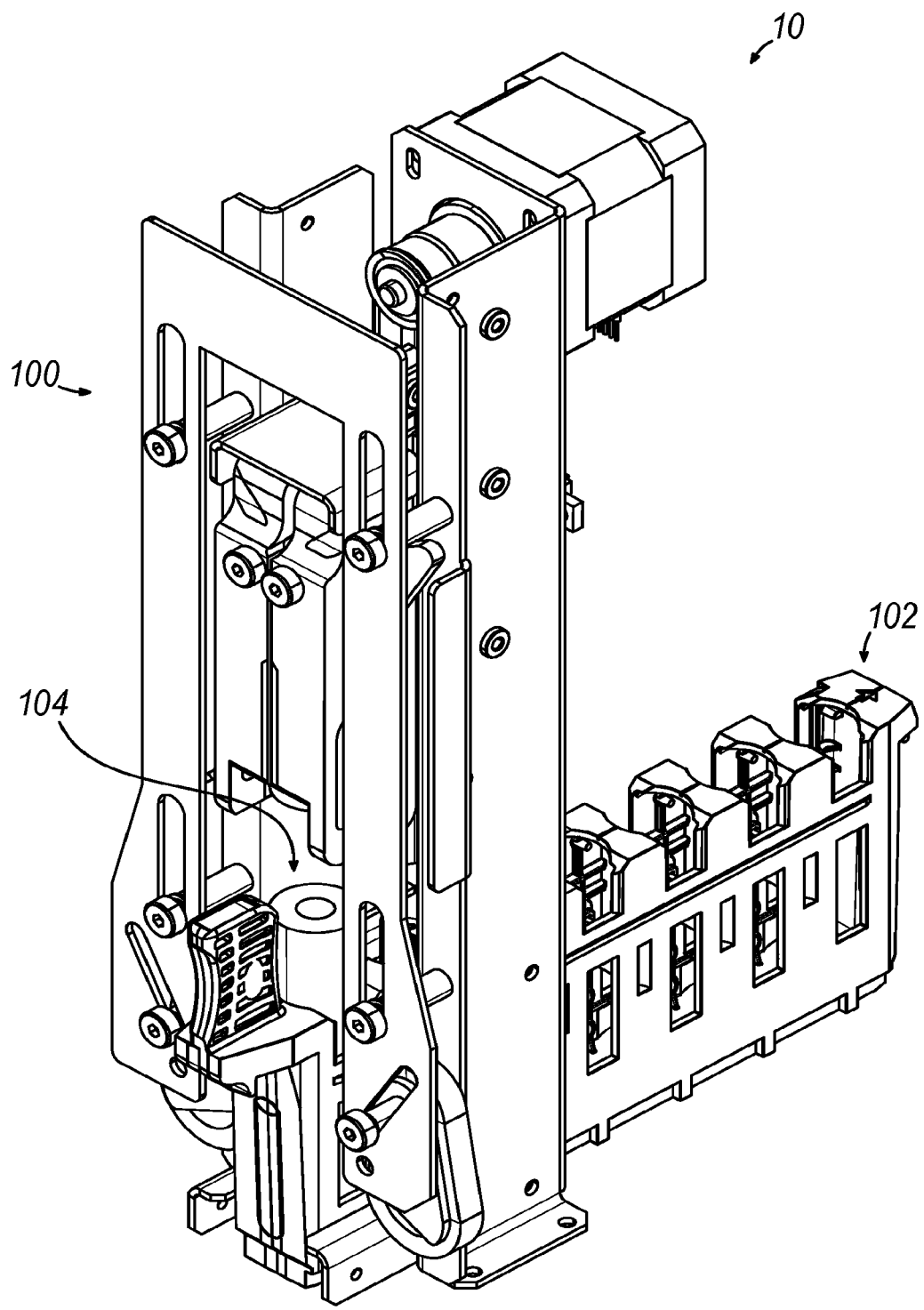
FIG. 1 shows a perspective view of an exemplary decapping system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. First Exemplary Decapping System

FIG. 1 shows a perspective view of an exemplary decapping system (10). The decapping system (10) includes a decapping device (100), a cartridge (102), and a sample tube (104). The cartridge (102) is adapted to hold one or more sample tubes, such as the sample tube (104), and may be placed within the decapping device (100). The decapping device (100) is operable to remove a cap from a sample tube that is aligned within the operative area of the decapping device (100), such as where the sample tube (104) is positioned. The cartridge (102) may be placed within the decapping device (100) and may be advanced through the decapping device (100) manually or automatically in order to align one or more sample tubes held by the cartridge (102) for decapping. For example, in some implementations the cartridge (102) may be placed in the decapping device (100) by a user and may then be automatically advanced through the decapping device (100), aligning each sample tube for decapping, by a cartridge routing device (not pictured) or other machine. In some implementations, the cartridge (102) may be automatically placed in the decapping device (100) by a cartridge routing device or other machine, in addition to being automatically advanced.

In some implementations, the decapping device (100) may be integrated within or coupled to another device. As an example, the decapping device (100) may be positioned within or coupled to an automated biochemical analyzer or automated biological testing system, such that the cartridge (102) may be received from a sample intake portion of the automated analyzer, and may route the cartridge (102), after automatically decapping one or more sample tubes, to a subsequent component or device of the automated analyzer. In such implementations, the cartridge routing device may be a component of the automated analyzer and may be operable to route cartridges to and from the decapping device (100). In further implementations, the decapping device (100) may receive the sample tube (104) itself rather than the cartridge (102) containing one or more sample tubes, with the sample tube (104) being carried by a sample routing device (e.g., similar to a cartridge routing device) or other sample holder.

Figure 2:
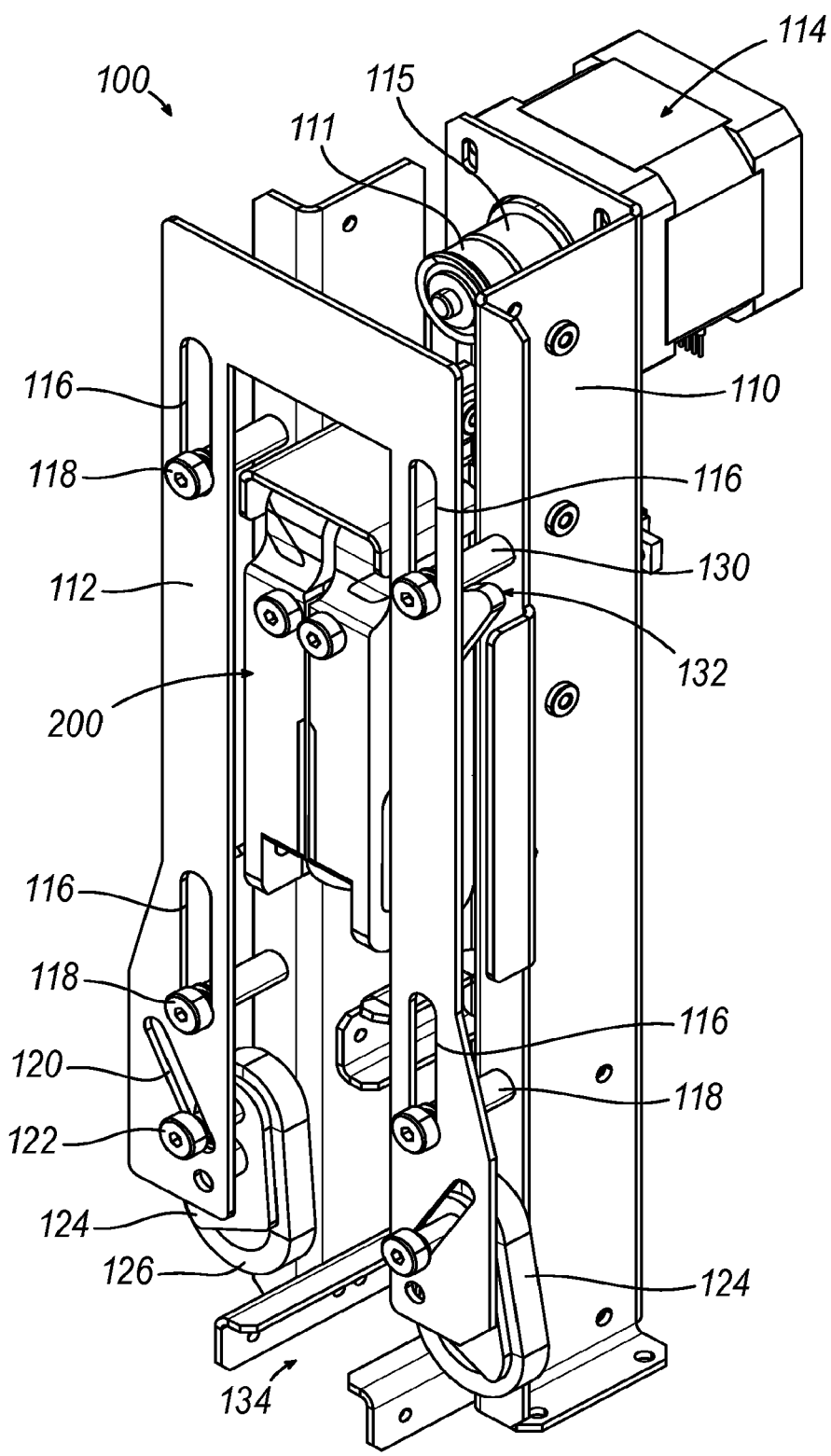
FIG. 2 shows a perspective view of an exemplary decapping device of the decapping system of FIG. 1.

FIG. 2 shows a perspective view of an exemplary decapping device, such as the decapping device (100). The decapping device (100) in FIG. 2 is shown without the cartridge (102) or the sample tube (104) in place. The decapping device (100) includes a frame (110) on which a retractor (112) is slideably mounted. The retractor (112) is mounted to the frame (110) with a set of slide bolts (e.g., three slide bolts (118), and a ejector bolt (130) that activates an ejector (132), as will be shown and described in more detail below) that are statically coupled to the frame (110) and are slideably coupled to the retractor (112) via a set of parallel slots (116) that run along the face of the retractor (112). The parallel slots are longitudinally parallel to the direction of sliding, such that the retractor (112) can move upwards and downwards relative to the frame (110) with the distance of movement being limited by the length of the parallel slots (116).

A set of grippers (124) are rotatably mounted to the frame (110) and positioned opposite each other, surrounding a tube area (134) and movable between a gripping position and a non-gripping position. The tube area (134) may be adapted to receive the sample tube (104) and/or the cartridge (102), and may include rails, guides, or other physical features that aid in maintaining the position of the sample tube (104) and/or cartridge (102) when positioned within the tube area (134) by a sample routing device (not pictured) or manually positioned by a user. Each of the set of grippers (124) includes a grip (126) that is adapted to contact and grip a sample tube within the tube area (134) when the set of grippers (124) rotate towards the tube area (134).

Figure 3:
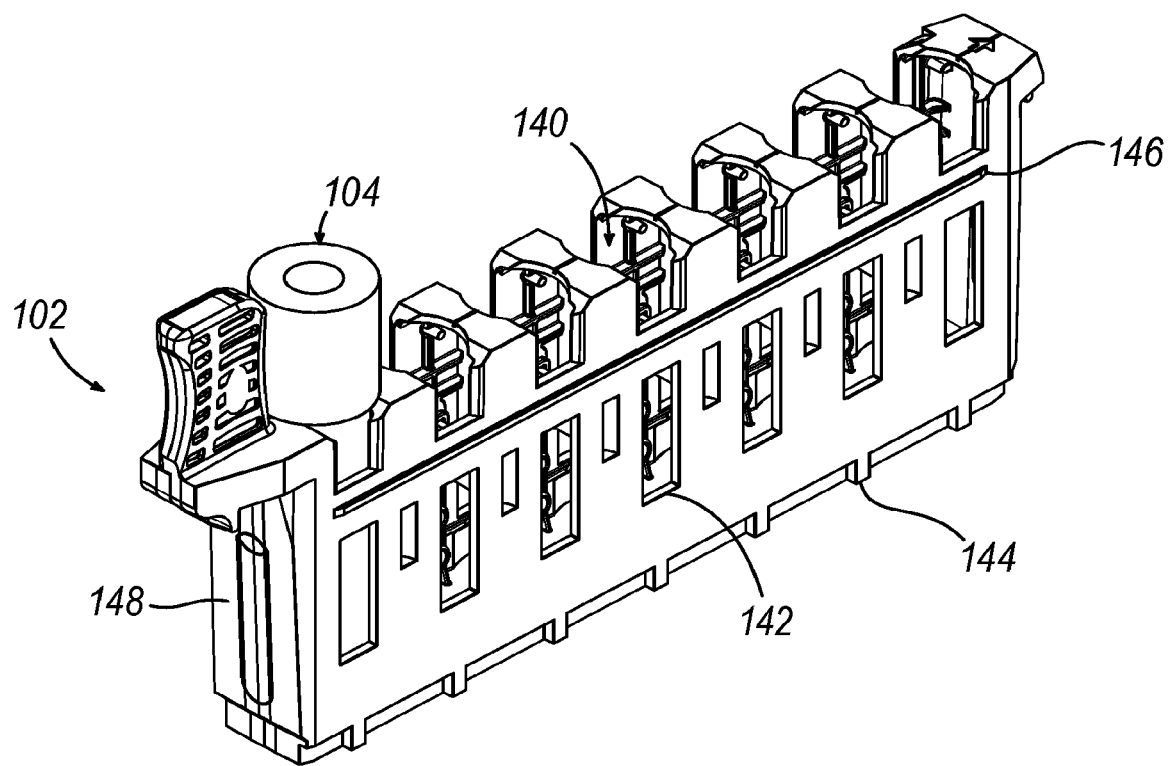
FIG. 3 shows a perspective view of an exemplary cartridge usable with the decapping device of FIG. 2.
Figure 4:
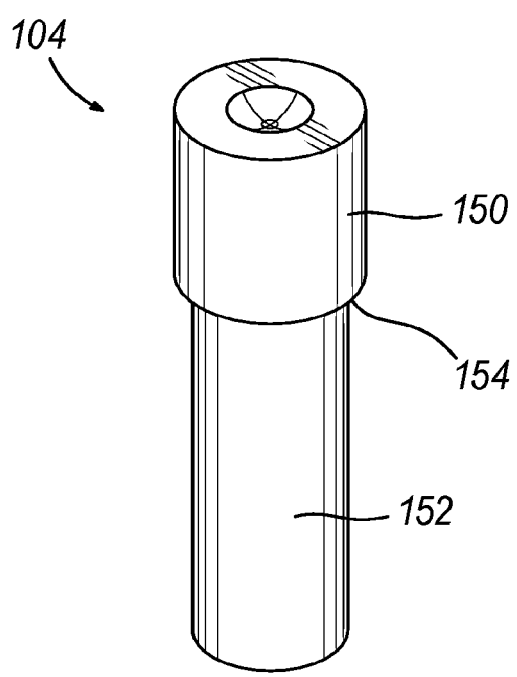
FIG. 4 shows a perspective view of an exemplary sample tube usable with the decapping device of FIG. 2.

With reference to FIGS. 3 and 4, which respectively show an exemplary cartridge such as the cartridge (102) and an exemplary sample tube such as the sample tube (104), several aspects of the grip (126) are described. As an example, in some implementations the grip (126) may be sized and shaped to fit within a grip slot (142) in a body (148) of the cartridge (102) when the set of grippers (124) rotates. A set of tube slots (140) are also within the body (148), with each grip slot (142) corresponding to a tube slot (140) such that a grip (126) entering the grip slot (142) will contact and, when contacted from opposite sides, grip the sample tube (104) therein. FIG. 3 also shows an upper guide (146) and a lower guide (144) formed into the body (148), which may correspond to one or more guide features of the tube area (134) in order to limit the movements of the cartridge (102) within the tube area (134). Use of the cartridge (102) with the sample tube (104) isolates movement of the sample tube (104) within the tube area (134), and also functions as a centering feature that can center the sample tube (104) within the operative portion of the tube area (134) to ensure predictable interactions between the decapping device (100) and the sample tube (104).

As another example of such an adaptation, the grip (126) may be formed of or coated with a flexible material such as a foam or rubber, which may allow for a tighter fit when gripping a body (152) of the sample tube (104). Such materials may also conform to the shape of the body (152) of the sample tube (104) in order to increase the surface area in contact against the gripped tube and may also provide a contact surface having a relatively high friction.

As shown in FIG. 2, the decapping device (100) also includes a latch mechanism (200) positioned within the frame (110) and coupled to a motor (114) that is operable to raise and lower the latch mechanism (200). The motor (114) may be an electric motor capable of linearly extending and retracting, or raising and lowering, the latch mechanism (200) relative to the frame (110). The motor (114) of FIG. 2 is depicted as an electric rotary motor having a drive rotor (115) in an upper portion of the frame (110), which is connected to a distal rotor (e.g., a distal rotor (113) in FIG. 6A) in a lower portion of the frame (110) by a drive belt (e.g., a drive belt (111) in FIG. 6A). In such an implementation, the latch mechanism (200) may be positioned within the frame (110) and coupled to the drive belt (111) in order to be raised and lowered by operation of the drive rotor (115). In some implementations, the motor (114) may instead be a linear actuator, hydraulic shaft, rotary screw drive, or other motor that may be operated to produce linear force to raise and lower the latch mechanism (200) within the frame (110). Some implementations of the decapping device (100) include only a single motor such as the motor (114), with such implementations actuating other functional portions of the decapping device (100) (e.g., an ejector (132), a set of grippers (124)) based upon the operation of the motor (114) and corresponding extension and retraction of the latch mechanism (200), as will be described in more detail below.

Movement of the latch mechanism (200) within the frame (110) results in activation or actuation of several functional features of the decapping device (100). As can be seen in FIG. 2, the retractor (112) is supported by the latch mechanism (200) when the latch mechanism (200) is in the raised or retracted position shown in FIG. 2. As the latch mechanism (200) is extended by operation of the motor (114) the retractor (112) will also extend, sliding along the set of bolts (118). Extension of the retractor (112) may be due to one or more of gravity or a spring bias or other flexible bias towards an extended position (e.g., such as by a spring connected to the retractor (112) at a first end and connected to a lower portion of the frame (110) at a second end). As the retractor (112) extends, a rotation bolt (122) that extends from each of the set of grippers (124) slides along a diagonal slot (120) of the retractor (112), causing the set of grippers (124) to rotate towards the tube area (134). The rotation bolt (122) is offset from a rotational axis (e.g., a rotational axis of a rotation bolt (141) in FIG. 7A) of each gripper (124), such that the force of sliding along the diagonal slot (120) causes a rotation of the gripper (124) around the rotation bolt (141) rather than a linear movement. In this manner, the set of grippers (124) can grip sample tubes having varying diameters, as the grip (126) is also offset from the rotation bolt (141) and so will have a variable distance of extension into the tube area (134) depending upon the range of rotation. The set of grippers (124) also function as a centering feature for tubes having varying diameters, as the rotation of opposing grippers (124) occurs simultaneously such that a tube that is positioned off-center will be contacted by one gripper and then pushed towards a centerline until contact is made with the second gripper.

As the set of grippers (124) contact and grip the sample tube (104) the retractor (112) will stop extending and will be supported by the rotation bolts (122) of the set of grippers (124) instead of being supported by the latch mechanism (200). The latch mechanism (200) may then continue extending by operation of the motor (114) until a cap (150) of the sample tube (104) is received and positioned within the latch mechanism (200), as will be shown and described in more detail below. The motor (114) may then be operated in reverse (e.g., by retracting a linear actuator, by operating an electric motor drive rotor (115) in the opposite direction) to retract the latch mechanism (200) and remove the cap (150) from the body (152). As the latch mechanism (200) pulls on the cap (150), the set of grippers (124), having a friction fit against the sample tube (104), may correspondingly rotate and tighten against the body (152) to provide a variable amount of grip pressure against the body (152). In this manner, the set of grippers (124) can limit the grip pressure applied to the body (152) to the force needed to counteract the pulling force on the cap (150), which may reduce the likelihood of damage to the body (152) as a result of unnecessarily high grip pressure. In some implementations, the set of grippers (124) may include a torque limiting feature such as a slip gear configuration to further limit the amount of pressure that may be applied to a gripped tube.

After the cap (150) is removed, the latch mechanism (200) retains the cap and continues to retract until it engages the retractor (112), which is then supported by the latch mechanism (200) rather than by the rotation bolts (122). As the latch mechanism (200) continues to retract, the retractor (112) is also retracted, which causes the set of grippers (124) to rotate away from the tube area (134), releasing the sample tube (104). As the latch mechanism (200) is retracted to a position near its point of origin (e.g., such as the position shown in FIG. 2), the ejector (132) contacts the ejector bolt (130) and causes the ejector (132) to eject the removed cap (150) from the latch mechanism (200), as will be shown and described in more detail below.

Figure 5A:
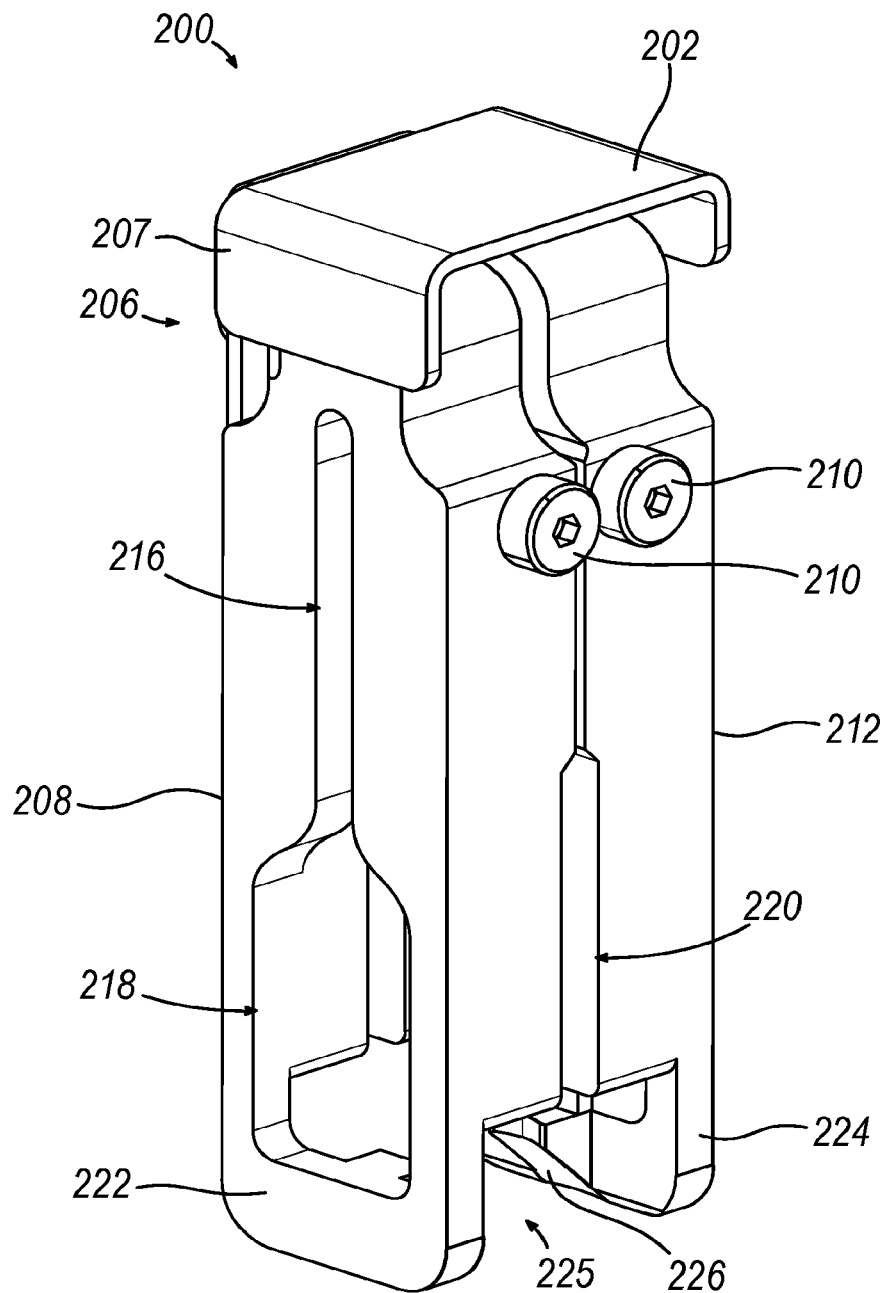
FIG. 5A shows a perspective view of an exemplary latch mechanism of the decapping device of FIG. 2.

As has been described, the latch mechanism (200) receives and removes the cap (150) during the decapping process. To provide additional detail, FIG. 5A shows a perspective view of an exemplary latch mechanism such as the latch mechanism (200). The latch mechanism (200) includes a first latch arm (208) and a second latch arm (212), opposite the first latch arm (208). The first latch arm (208) and the second latch arm (212) are each coupled to a latch plate (206), which itself is coupled to the motor (114). The first latch arm (208) and the second latch arm (212) are rotatably coupled to the latch plate (206) via a respective rotation bolt (210), which allows the coupled latch arm (208, 212) a range of rotation relative to the latch plate (206). The range of rotation of the first latch arm (208) and the second latch arm (212) may be limited by one or more of a limiter portion (207) of the latch plate (206), the frame (110), the retractor (112), and the opposing latch arm (208, 212). For example, with reference to FIG. 5B, upper portions of the first latch arm (208) and the second latch arm (212) are shaped to provide a gap (209) between that allows each latch arm (208, 212) a limited range of rotation before contacting the other. The latch plate (206) also includes a retractor plate (202), which engages and supports the retractor (112) at varying stages of extension and retraction, as has been described.

The first latch arm (208) and the second latch arm (212) each contain cavities that define an ejector slot (216) in which the ejector (132) may be rotatably coupled, though the ejector (132) itself is not shown in FIG. 5A. The cavities of the first latch arm (208) and the second latch arm (212) also define a cap chamber (220) within which the cap (150) and other caps of varying sizes may be retained after removal from the body (152). The cavity of the first latch arm (208) also defines an ejector port (218) through which the cap (150) may be ejected by the ejector (132), as will be shown and described in more detail below.

A first cap engaging portion (222) and a second cap engaging portion (224) extend from the arms and each provide an upper surface that contacts and supports a lower lip (154) of the cap (150) in order to latch onto the cap (150) and allow it to be pulled and removed when the latch mechanism (200) is retracted. The first cap engaging portion (222) and the second cap engaging portion (224) define a cap area (225) which receives the cap (150) as the latch module (200) is extended onto the sample tube (104). As the cap (150) is received, a contoured portion (226) of each of the first cap engaging portion (222) and the second cap engaging portion (224) contacts the top of the cap (150) and translates the linear force of the cap (150) against the contoured portion (226) into a rotational force for that respective latch arm (208, 212). For example, in FIG. 5A the contoured portion (226) is depicted as an angled surface on an underside of the second cap engaging portion (224). When the angled contoured portion (226) contacts the cap (150), the second latch arm (212) will rotate about the rotation bolt (210), which in effect increases the size of the cap area (225). In effect, the contoured portion (226) may function as an additional centering feature that aligns the cap (150) with the latch mechanism (200). This allows the latch mechanism (200) to accommodate caps of varying diameters, as the cap area (225) size will increase corresponding to the diameter of the cap, and also allows the first cap engaging portion (222) and the second cap engaging portion (224) to latch onto the lower lip (154) of the cap (150) after the cap is fully within the cap chamber, as the latch arms (208, 212) will rotate back to their origin positions and return the cap area (225) to its original size.

Figure 5B:
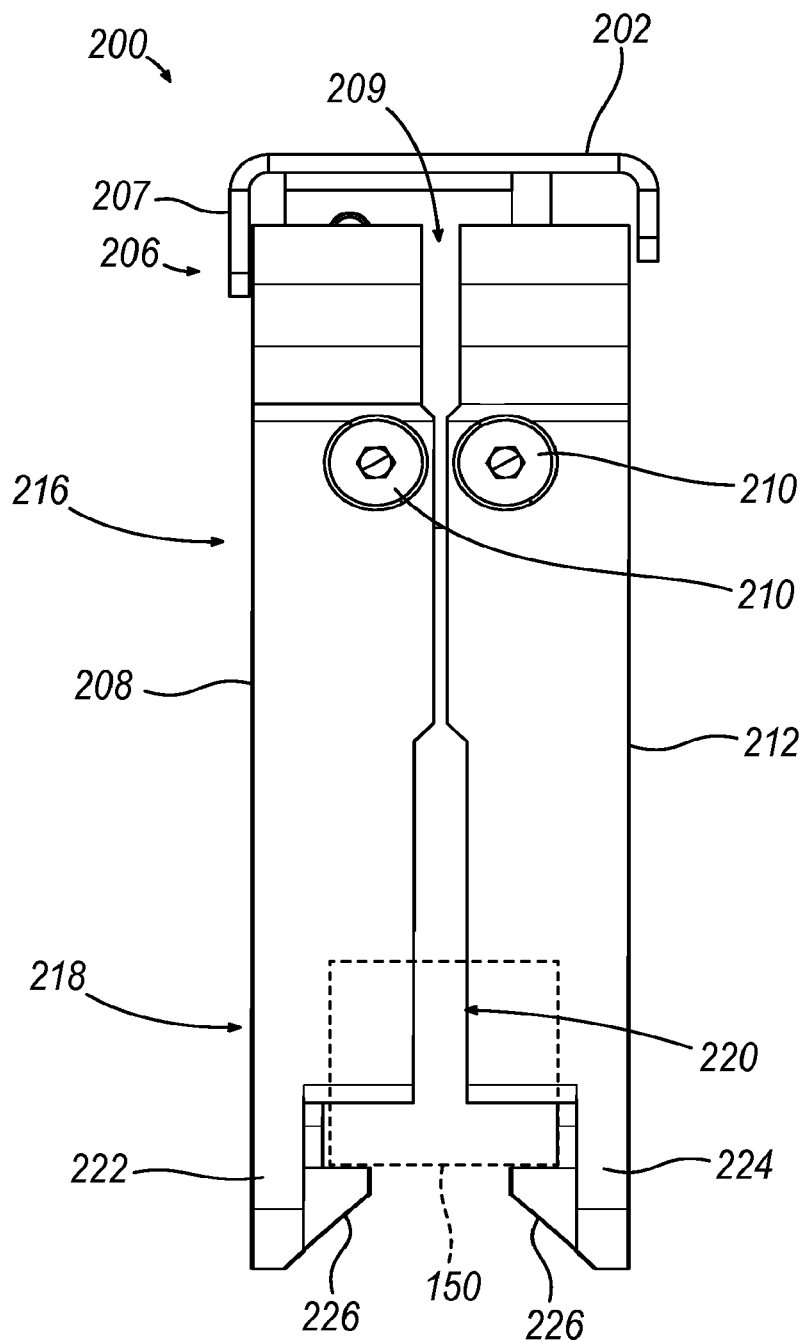
FIG. 5B shows a front elevation view of the latch mechanism of FIG. 5A.

FIG. 5B shows a front elevation view of the latch mechanism of FIG. 5A, in which the contoured portions (226) of the first cap engaging portion (222) and the second cap engaging portion (224) can be seen, as well as the configuration of the first latch arm (208) and the second latch arm (212) that defines the gap (209) and allows for a range of rotation of the latch arms (208, 212). The approximate position of the cap (150) after removal from the body (152) is indicated as a dotted line, which can be seen resting on the upper surface of the first cap engaging portion (222) and the second cap engaging portion (224) within the cap chamber (220).

Figure 6A:
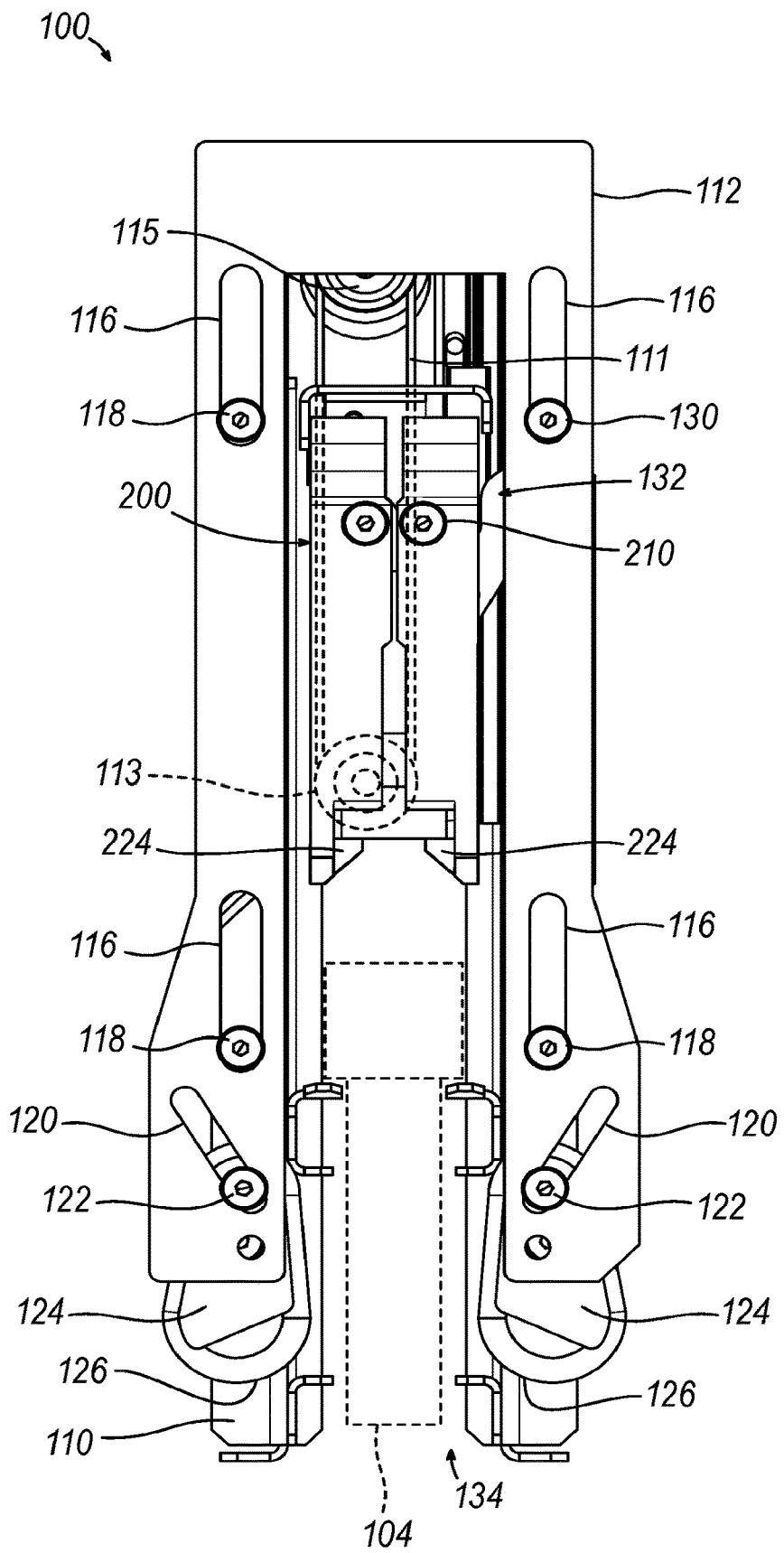
FIG. 6A shows a front elevation view of the decapping device of FIG. 2 with the latch mechanism in an exemplary first position.

To provide further examples of the function of the decapping device (100), FIG. 6A shows a front elevation view of the decapping device of FIG. 2 with the latch mechanism (200) in an exemplary origin position, which may correspond to a fully retracted position of the latch mechanism (200). The distal rotor (113) and the drive belt (111) are visible within the frame (110), and portions of the ejector (132) can also be seen. The approximate position of the sample tube (104), whether positioned within the tube area (134) by itself or within the cartridge (102), is illustrated by a dotted line within the tube area (134).

Figure 6B:
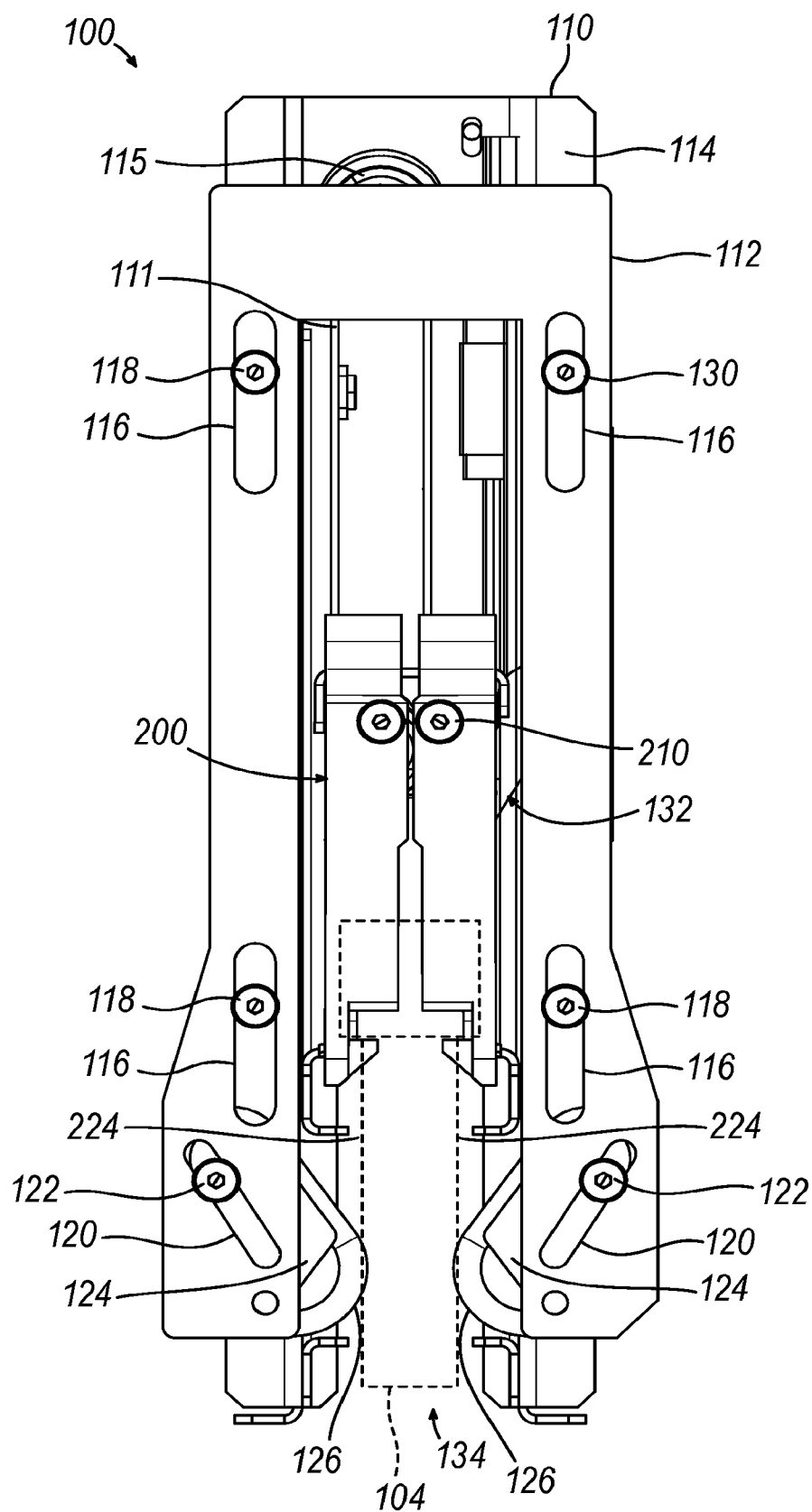
FIG. 6B shows a front elevation view of the decapping device of FIG. 2 with the latch mechanism in an exemplary second position.

FIG. 6B shows a front elevation view of the decapping device (100) with the latch mechanism (200) in an exemplary extended position, which may correspond to a fully extended position of the latch mechanism (200). In that figure, the approximate position of the sample tube (104) is illustrated by a dotted line within the tube area (134), with the cap (150) positioned within the cap chamber (220) of the latch mechanism (200), and the first cap engaging portion (222) and the second cap engaging portion (224) latched under the lower lip (154) of the cap (150). The rotation of the set of grippers (124) can also be seen, relative to their original position in FIG. 6A, with such rotation being a result of the rotation bolt (122) of each of the set of grippers (124) sliding along the diagonal slot (120) as the retractor (112) extends along the range of movement of the set of parallel slots (116).

Figure 7A:
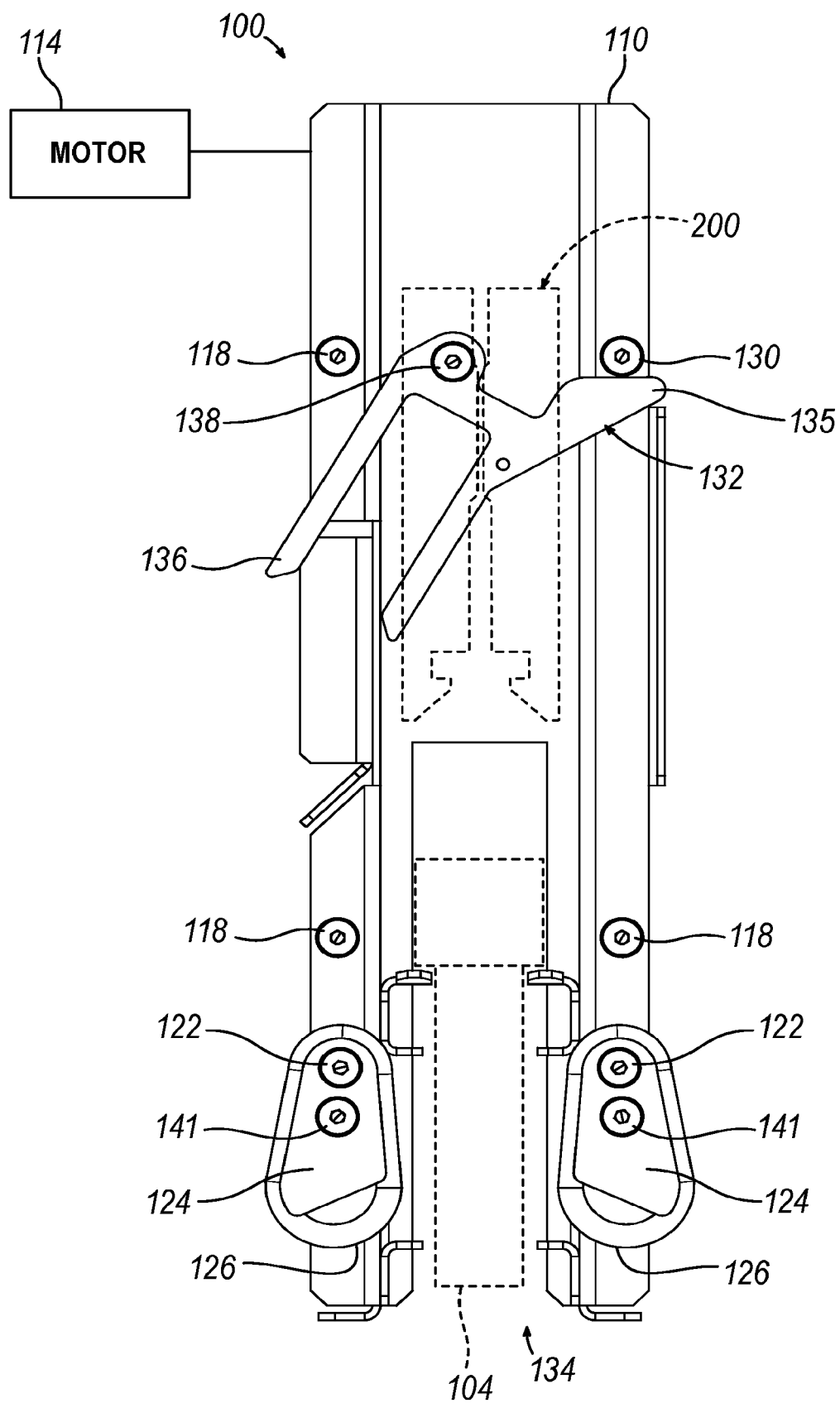
FIG. 7A shows a schematic diagram that illustrates aspects of the decapping device while in the first position of FIG. 6A, prior to decapping a sample tube.
Figure 7B:
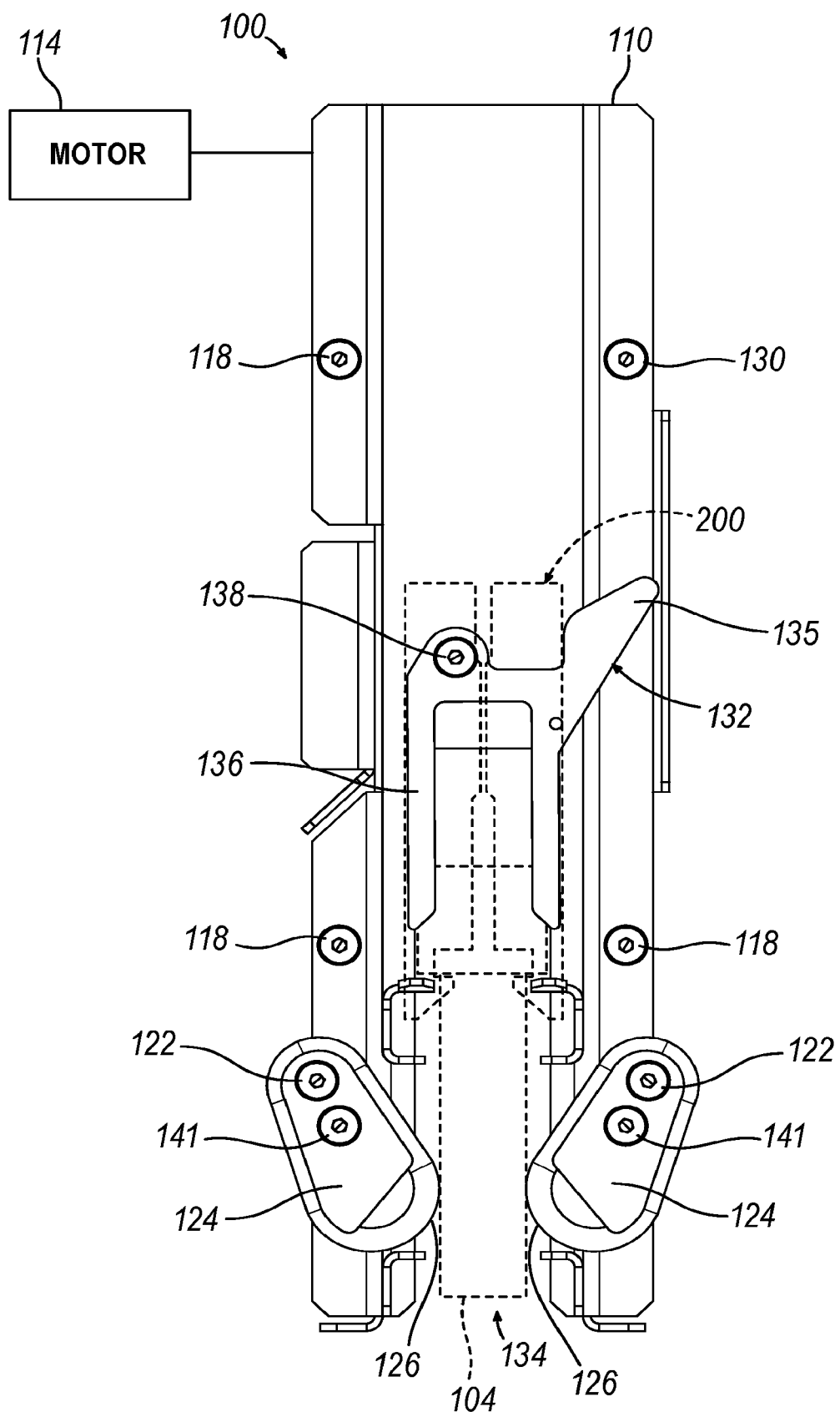
FIG. 7B shows a schematic diagram that illustrates aspects of the decapping device while in the second position of FIG. 6B.
Figure 7C:
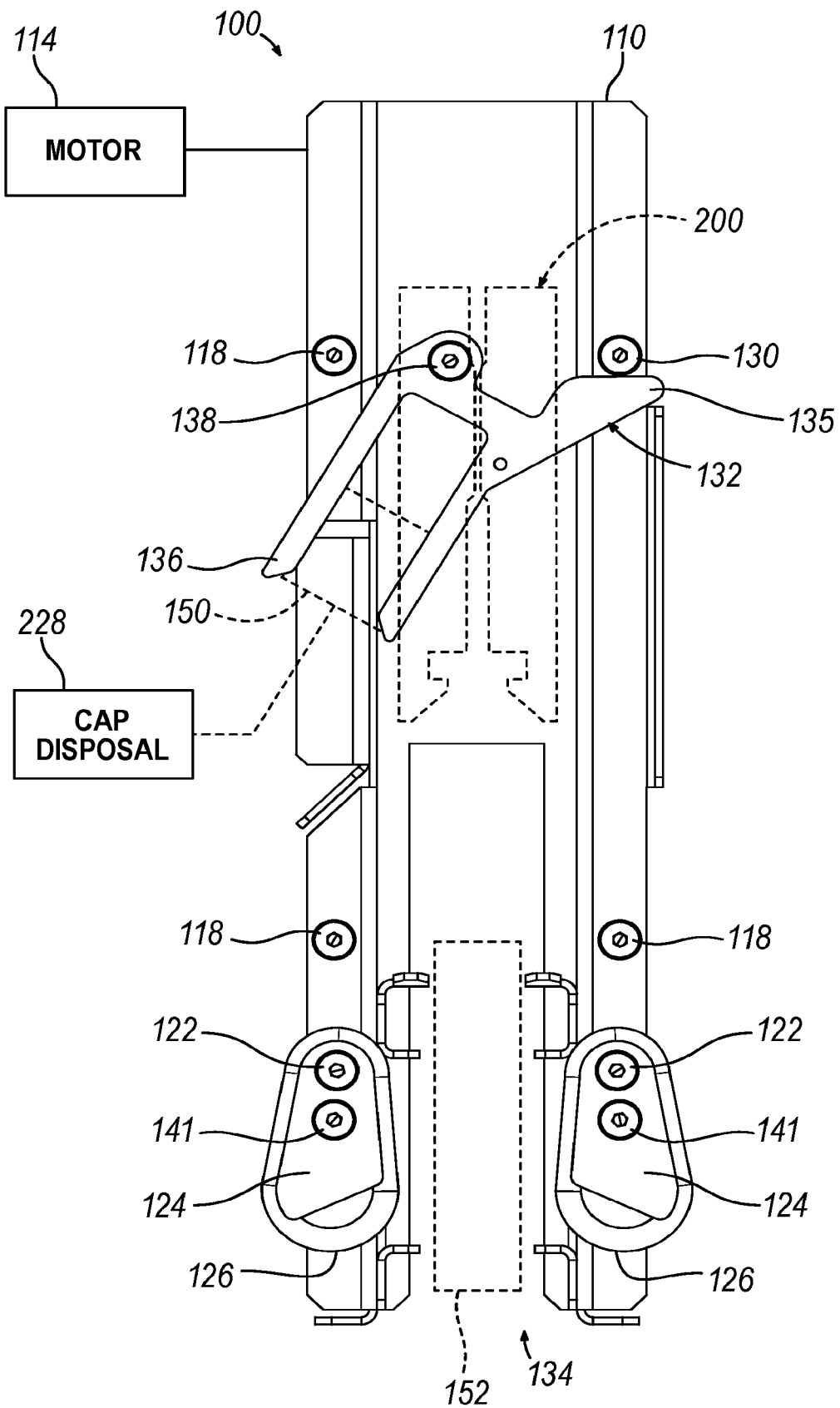
FIG. 7C shows a schematic diagram that illustrates aspects of the decapping device while in the first position of FIG. 6A, after decapping a sample tube.

As has been described, the ejector (132) of the latch mechanism (200) functions to automatically eject a removed cap from the latch mechanism (200) as a result of the latch mechanism (200) returning to its origin position (e.g., the origin position shown in FIG. 6A). In other words, a first "stroke" or movement of latch mechanism (200) grabs the cap, a second stroke lifts the cap, and a third stroke ejects the cap. FIGS. 7A-7C further illustrate the features of the ejector (132) and other aspects of the decapping device (100). FIG. 7A shows a schematic diagram of the decapping device (100) in a position such as the origin position of FIG. 6A, prior to decapping a sample tube such as the sample tube (104). In order to provide improved visibility, the retractor (112) is omitted, the motor (114) is shown as a schematic box, and the latch mechanism (200) and the sample tube (104) are respectively illustrated as dashed and dotted lines.

In FIG. 7A, the ejector (132) is rotatably mounted within the cavities of the latch mechanism (200) by a rotation bolt (138) (e.g., which may be coupled to the first latch arm (208)) to allow rotation relative to the latch mechanism (200). The ejector (132) includes a contact portion (135) positioned to contact the ejector bolt (130) and rotate the ejector (132) to the position shown in FIG. 7A. In that position, the ejector (132) is rotated such that an ejector arm, shown in FIG. 7A as an ejector fork (136), extends from the latch mechanism (200) (e.g., from within the ejector port (218) and/or ejector slot (216). The set of grippers (124) can also be seen rotated away from the tube area (134), around the rotational axis of the rotation bolt (141) of each gripper.

FIG. 7B shows a schematic diagram of the decapping device (100) in a position such as the extended position of FIG. 6B. In that figure, the contact portion (135) of the ejector (132) is no longer in contact with the ejector bolt (130), and the ejector (132) has rotated such that the ejector fork (136) is now fully within the latch mechanism (200). As the latch mechanism (200) is lowered and receives the cap (150) of the sample tube (104), the ejector fork (136) is also positioned such that the cap (150) is between the two blades of the ejector fork (136). The ejector fork (136) may rotate to the shown position due to gravity, due to a spring bias or other flexible bias, or both. The set of grippers (124) can also be seen rotated towards the tube area (134) around each rotation bolt (141), as a result of the extension of the retractor (112), which is omitted in that figure for visibility but is shown in FIGS. 2 and 6A-6B.

FIG. 7C shows a schematic diagram of the decapping device (100) in a position such as the origin position of FIG. 6A, after decapping a sample tube such as the sample tube (104). In that figure, the contact portion (135) of the ejector (132) has contacted the ejector bolt (130) as the latch mechanism (200) is retracted back to its origin position. As a result, the ejector (132) has rotated at the rotation bolt (138) and the ejector fork (136) has rotated outwards from the ejector port (218), resulting in the removed cap (150) being pushed outwards from the ejector port (218), where it can fall from the ejector fork (136) into a cap disposal (228), which may be a bin, tray, or other surface or receptable where a plurality of removed caps may collect until they are disposed, and which may be a component or compartment in another device that the decapping device (100) is integrated with, such as an automatic analyzer. The set of grippers (124) can also be seen rotated away from the tube area (134), back to their original position, as a result of the retractor (112) being engaged by and retracted with the latch mechanism (200).

As will be apparent to one of ordinary skill in the art in view of the teachings herein, the decapping device (100) described above and its function as described in FIGS. 6A-7C is exemplary, and some implementations of the decapper (100) will have variations. For example, while the ejector fork (136) is shown as having a pair of tines, it should be understood that an ejector arm could be implemented as a cylindrical or rectangular ejector having a cavity to receive the cap, or could be implemented having varying other shapes that receive and guide the cap to ejection once removed. As another example, while the retractor (112) is described and shown as being slideably coupled to the frame (110), it should be understood that implementations of the decapper (100) are also possible that include the retractor (112) rotating relative to the frame (110), extending from and retracting to the frame (110), and sliding in varying directions relative to the frame (110) (e.g., horizontally, vertically, or both to varying degrees). As yet another example, while the grippers (124) are described as being movable by the diagonal slot (120), it should be understood that implementations of the decapper (100) are also possible that include the set of grippers (124) being pivotably displaced during gripping, or otherwise rotated and extended during gripping. Other variations of the decapper (100) exist and will be apparent to those of ordinary skill in the art in light of this disclosure.

Figure 8:
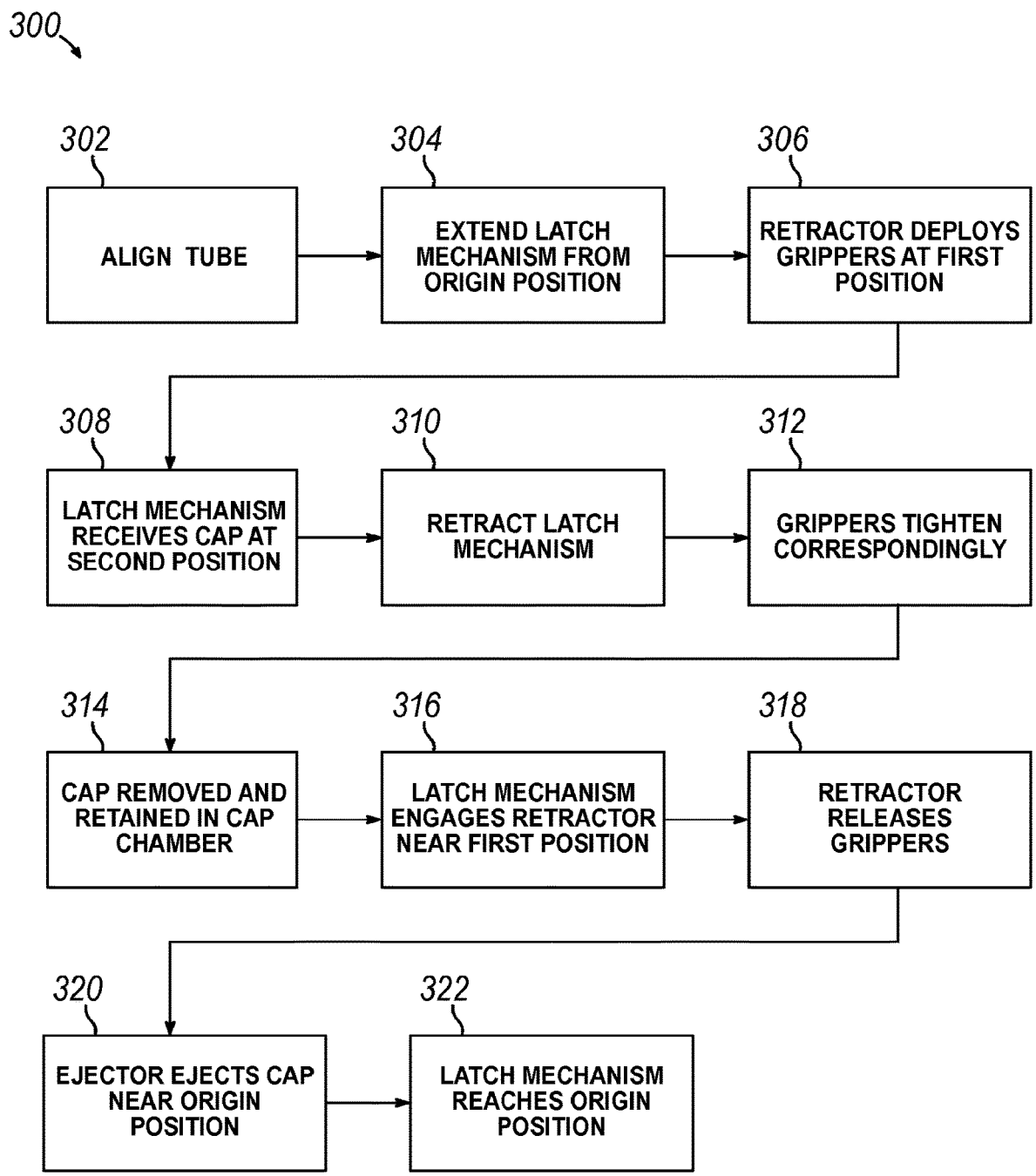
FIG. 8 shows a flowchart of an exemplary set of steps performed while decapping a sample tube with the decapping system of FIG. 1.

While they have been described above in some detail, FIG. 8 shows a flowchart of an exemplary set of steps (300) performed while decapping a sample tube such as the sample tube (104). The sample tube (104) may be aligned (302) within the tube area (134), which may be a manual or automated process, and may include placing the sample tube (104) by itself, or by placing the cartridge (102) containing one or more samples tubes.

The motor (114) may be operated to begin extending (304) the latch mechanism from an origin position (e.g., the position in which the latch mechanism (200) is shown in FIG. 7A), allowing the ejector (132) to rotate into the latch mechanism (200), and causing the set of grippers (124) to begin rotating towards the tube area (134). At a first position during extension, wherein the first position is located at or prior to the maximum extension distance of the retractor (112), the set of grippers (124) will be deployed (306) to contact and grip the sample tube (104). The location of the first position may depend upon factors such as the diameter of the sample tube (104), the distance at which the grip (126) is offset from the rotation bolt (141), and the flexibility of the material from which the grip (126) is produced.

The latch mechanism (200) may then receive (308) the cap (150) of the sample tube (104) at a second position (e.g., the position in which the latch mechanism (200) is shown in FIG. 7B), which may include the first latch arm (208) and the second latch arm (212) rotating to allow the cap (150) to pass into the cap chamber (220) and rest between the blades of the ejector fork (136) and then rotating back to their original position to latch the first cap engaging portion (222) and the second cap engaging portion (224) under the lower lip (154) of the cap (150). The location of the second position may be at or prior to the maximum extension distance of the latch mechanism (200) but after the location of the first position along the extension path.

The motor (114) may then be operated to begin retracting (310) the latch mechanism (200) back to the origin position, resulting in the latch mechanism (200) applying force to the cap (150) in the direction of cap removal. The set of grippers (124) may tighten (312) their grip on the sample tube (104) to a pressure corresponding to the force applied to the cap (150) in the direction of cap removal. During retraction, the cap (150) will be removed (314) from the body (152) as a result of the applied force and retained in the cap chamber (220) by interior walls of the first latch arm (208), the second latch arm (212), and the ejector fork (136).

As retraction of the latch mechanism (200) continues, after removal of the cap (150), the latch mechanism (200) will engage (316) and support the retractor (112) at or near the first position, causing the retractor (112) to begin retracting with the latch mechanism (200). As a result, the retractor (112) will release (318) the set of grippers (124) from the body (152) by rotating the set of grippers (124) away from the tube area (134) as it is retracted.

As retraction of the latch mechanism (200) continues and it reaches a point at or near the origin position, the ejector (132) may then rotate and eject (320) the cap (150) as a result of the contact portion (135) contacting the ejector bolt (130). The latch mechanism (200) may then arrive (322) at the origin position, and operation of the motor (114) may cease. As can be seen by the set of steps (300), a device such as the decapping device is capable of a multi-stage decapping process, including multiple moving components (e.g., the latch mechanism (200), the ejector (132), the set of grippers (124)) that are all driven by operation of a single motor (e.g., the motor (114)). This may be advantageous in that providing a decapping device that includes only a single motor which drives every function of the device may reduce the complexity, cost, and maintenance needs for such devices, in addition to other benefits. However, it should also be understood that some implementations of the decapping device may include one or more motors such as the motor (114), as may be desirable for a particular implementation or application.

Further, disclosed above are various features that allow for sample tubes such as the sample tube (104) to have varying body heights and diameters, as well as varying cap heights and diameters. For example, the function of the set of grippers (124) allows a tube body of varying diameter to be gripped without first determining (e.g., by using a sensor or accessing a pre-configured value) the diameter of the body. Similarly, the function of the latch mechanism (200) allows for sample tube caps of varying heights and diameters to be latched onto and removed without first determining the height or diameter. In each case, the operative component is instead configured to determine and adapt to varying heights and diameters mechanically and in real-time during a decapping operation. Further, it should be noted that where the cartridge (102) is used to hold multiple sample tubes, each sample tube may be of a different height, and the decapping device (100) does not require any determination or pre-configuration of the positions, heights, or other characteristics of sample tubes held by the cartridge (102).

For example, an implementation of the decapping device (100) is capable of engaging with and decapping sample tubes of heights between about 75 mm and about 125 mm. Implementations capable of accommodating tubes less than 75 mm or greater than 125 mm are also possible, with characteristics such as the distance between the latch mechanism (200) origin position and maximum extension position being variable to accommodate sample tubes that are particularly short or tall.

As another example, an implementation of the decapping device (100) is capable of receiving and latching onto caps having diameters between about 12 mm and about 17 mm. Implementations capable of accommodating tubes outside of such a range are also possible, with characteristics such as the cap area (225), and the range of rotation of the first latch arm (208) and the second latch arm (212) being variable to accommodate sample tube caps that are particularly small or large.

II. Second Exemplary Decapping System

Figure 9:
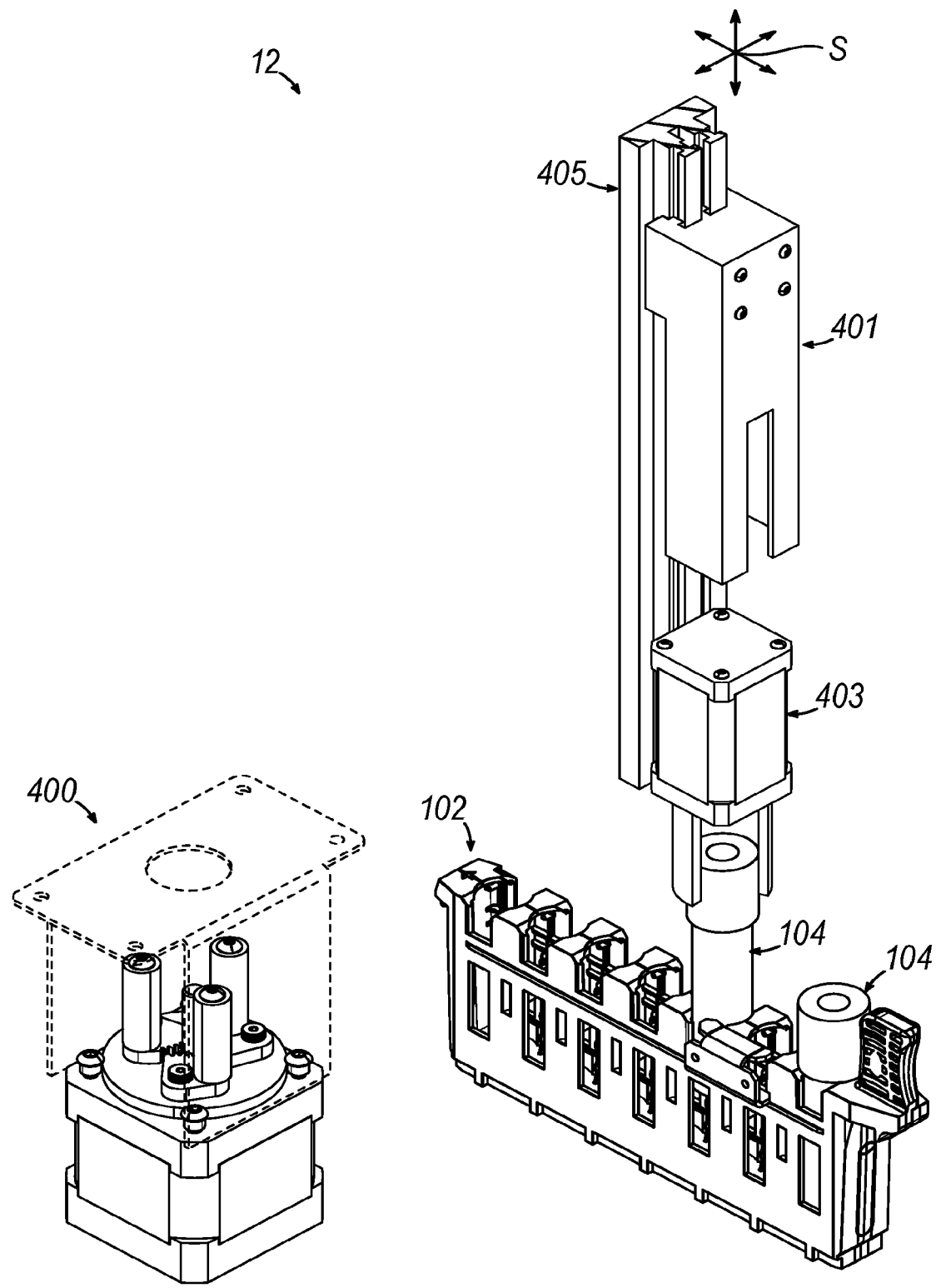
FIG. 9 shows a perspective view of another exemplary decapping system.

FIG. 9 shows a perspective view of another exemplary decapping system (12). The decapping system (12) includes a decapping device (400), a routing device (401), the cartridge (102) described above, and one or more sample tubes (104) described above. The cartridge (102) is adapted to hold one or more sample tubes, such as the one or more sample tubes (104), which may each be individually placed within the decapping device (400). The decapping device (400) is operable to cooperate with the routing device (401) to remove a cap from a sample tube that is aligned within the operative area of the decapping device (400), such as where the sample tube (104) is positioned in FIG. 10. Each sample tube (104) may be selectively placed within the decapping device (400) manually or automatically in order to align the sample tube (104) for decapping. For example, in some implementations each sample tube (104) may be automatically removed from the cartridge (102) and placed in the decapping device (400) by the routing device (401).

In this regard, the routing device (401) may include a handler (403) having one or more cap engaging portions (not shown) that provide one or more upper surfaces for contacting and supporting the lower lip (154) of the cap (150) of the sample tube (104) in order to latch onto the cap (150) and allow it to be manipulated alone or together with the body (152) of the sample tube (104) by the routing device (401). In some implementations, the handler (403) may also have one or more cartridge engaging portions for contacting and supporting the body (148) of the cartridge (102) in order to allow the cartridge (102) to be manipulated alone or together with the sample tube(s) (104) by the routing device (401). In any event, the routing device (401) further includes a multi-axis gantry (405) for transporting the handler (403) together with a load (e.g., the cartridge (102), cap (150), and/or body (152)) carried thereby. The multi-axis gantry (405) may be configured in any suitable known manner for moving the handler (403) linearly and/or angularly. While the present version includes a 3-axis gantry (405) as indicated by coordinate system (S), it will be appreciated that a gantry having any suitable number of axes, such as a single-axis gantry or a 2-axis gantry, may be used depending on the particular application. Thus, the routing device (401) may be configured to selectively transport each sample tube (104) from the cartridge (102) to the decapping device (400), continue supporting the cap (150) of the sample tube (104) while the decapping device (400) removes the cap (150) from the body (152) of the sample tube (104), transport the removed cap (150) to a cap disposal (not shown), and retrieve the decapped body (152) of the sample tube (104) from the decapping device (400) for returning to the cartridge (102) and/or transporting to another device.

In some implementations, the decapping device (400) may be integrated within or coupled to another device. As an example, the decapping device (400) may be positioned within or coupled to an automated biochemical analyzer or automated biological testing system, such that the cartridge (102) may be received from a sample intake portion of the automated analyzer, and may route the cartridge (102), after automatically decapping one or more sample tubes, and/or individual decapped sample tubes (104) to a subsequent component or device of the automated analyzer. In such implementations, the routing device (401) may be a component of the automated analyzer and may be operable to route sample tubes (104) individually to and from the decapping device (400).

Figure 10:
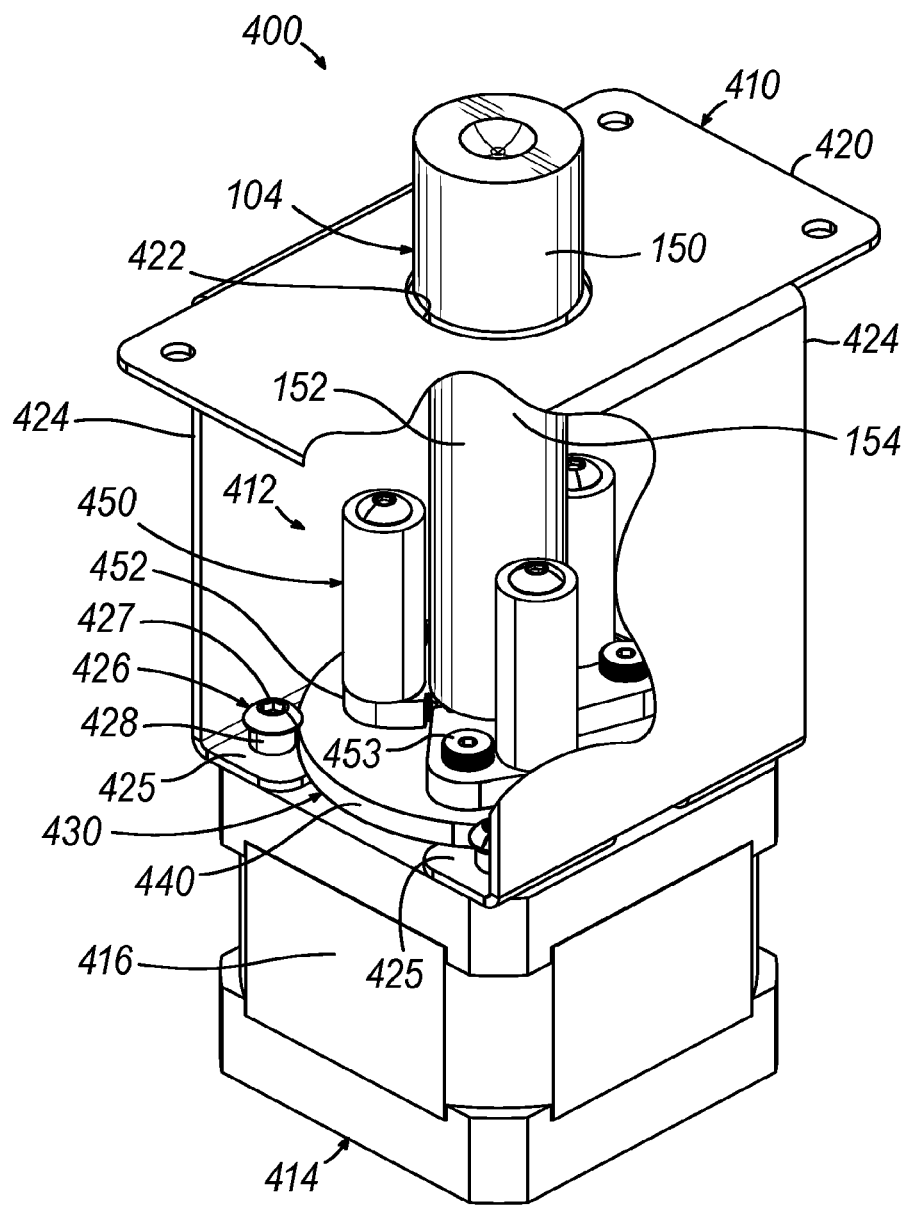
FIG. 10 shows a perspective view of an exemplary decapping device of the decapping system of FIG. 9 with an exemplary sample tube positioned in a tube area thereof.
Figure 11A:
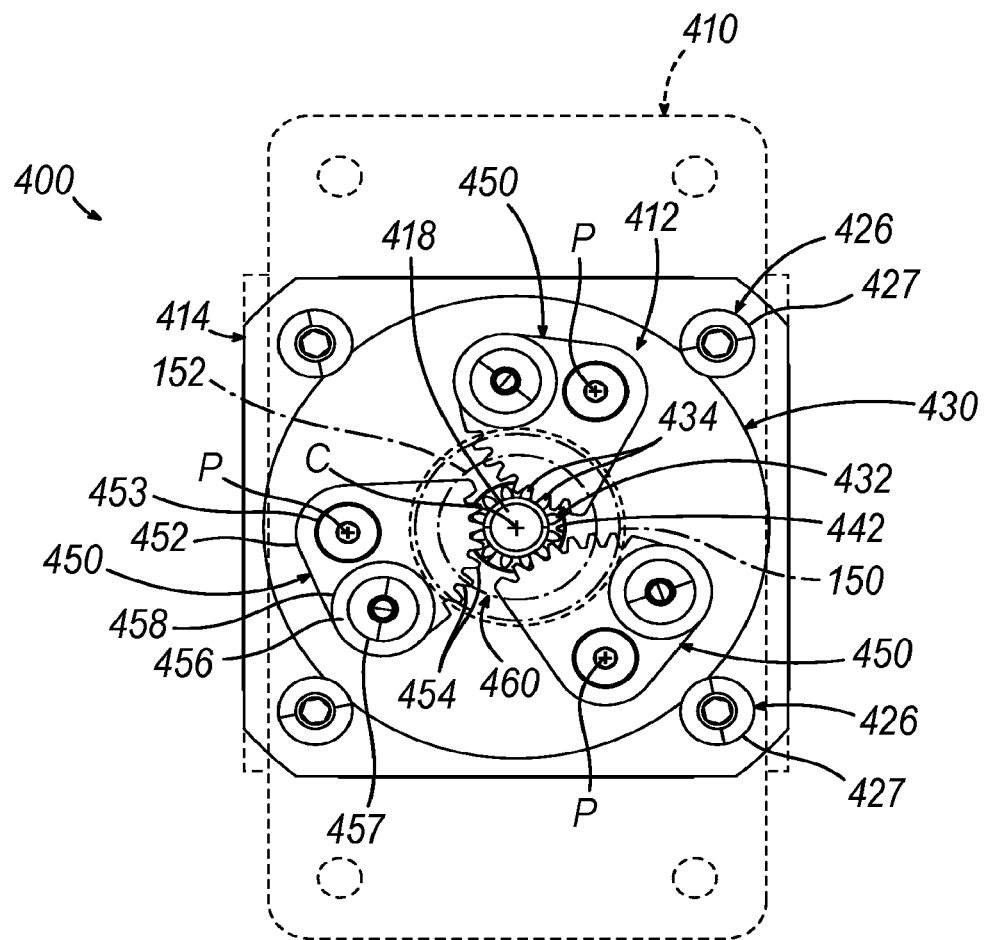
FIG. 11A shows a top elevation view of the decapping device of FIG. 10 with a gripper head of the decapping device in an exemplary first orientation about a central axis thereof, and with grippers of the gripper head in exemplary first positions relative to each other such that the grippers are spaced radially outwardly from a sample tube body.
Figure 11B:
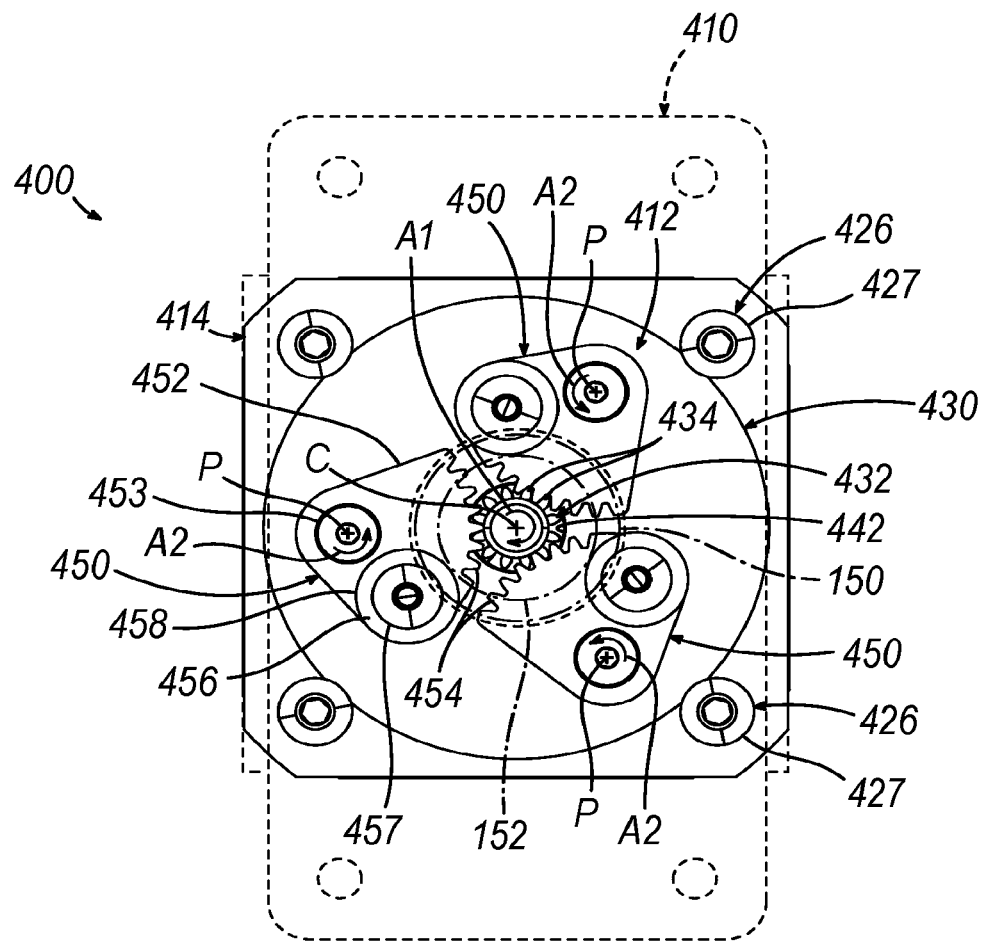
FIG. 11B shows a top elevation view of the decapping device of FIG. 10 with the gripper head in the first orientation about the central axis, and with the grippers in exemplary second positions relative to each other such that the grippers contact and grip the sample tube body.
Figure 11C:
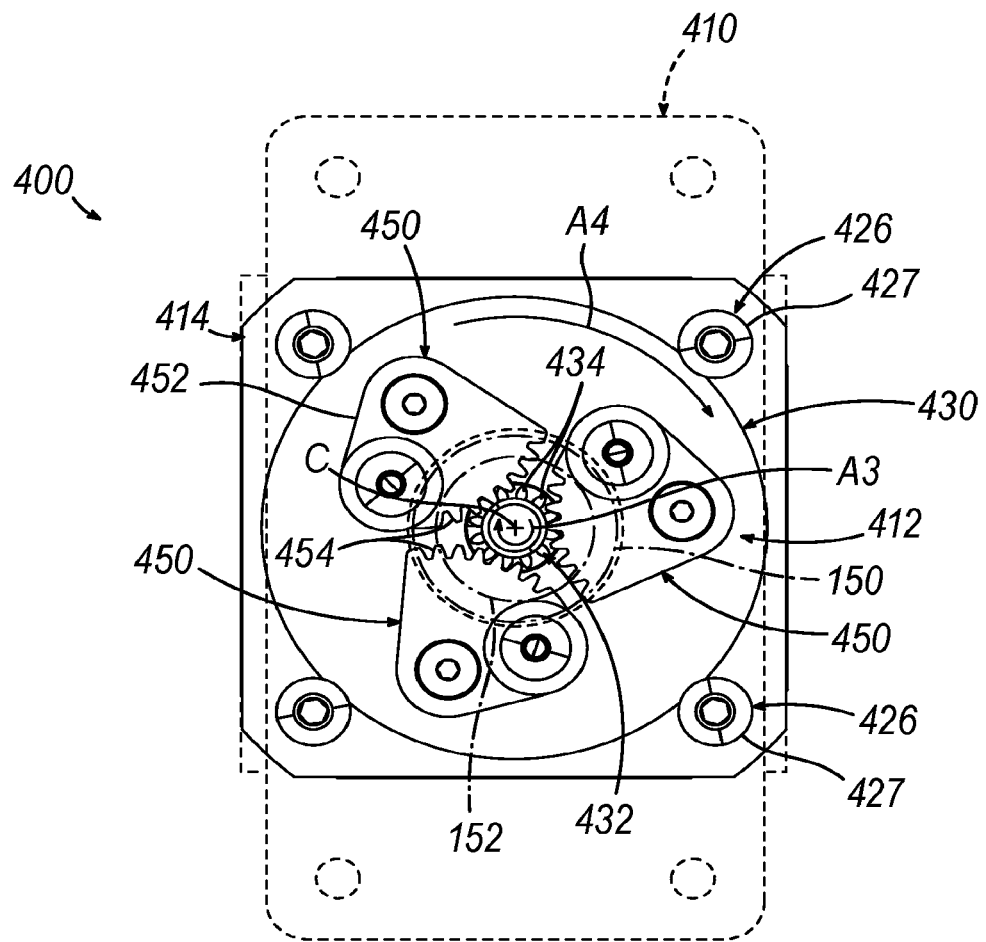
FIG. 11C shows a top elevation view of the decapping device of FIG. 10 with the grippers in the second positions relative to each other such that the grippers contact and grip the sample tube body, and with the gripper head in an exemplary second orientation about the central axis.

FIG. 10 shows a perspective view of an exemplary decapping device, such as the decapping device (400). The decapping device (400) in FIG. 2 is shown with the sample tube (104) in place. The decapping device (400) includes a frame (410), a decapping assembly (412), and a motor (414) having a motor housing (416) and an output shaft (418) (FIGS. 11A-11C). As shown, the frame (410) includes an upper guide plate (420) having a central guide bore (422) sized and shaped to slidably receive the cap (150) and/or body (152) of the sample tube (104), and further includes an opposing pair of sidewalls (424) extending downwardly from the upper guide plate (420) to respective flanges (425). The flanges (425) of the frame (410) are each fixedly coupled to the output side of the motor housing (416) via respective fasteners, such as bolts (e.g., button-headed screws) (426) with heads (427). In the example shown, the head (427) of each bolt (426) is spaced apart from the respective flange (425) by a corresponding spacer (428).

As shown, the decapping assembly (412) includes a gripper head (430) and a drive gear (432) (FIGS. 11A-11C) fixedly coupled to the output shaft (418) of the motor (414) such that the drive gear (432) is rotatable together with the output shaft (418). The drive gear (432) includes a plurality of drive gear teeth (434) for selectively transmitting torque from the output shaft (418) of the motor (414) to various portions of the gripper head (430), as described in greater detail below.

The gripper head (430) includes a platform (440) rotatably mounted to the output side of the motor housing (416). In this regard, the platform (440) includes a central platform bore (442) (FIGS. 11A-11C) which defines a central axis (C) and which rotatably receives the drive gear (432) and/or the output shaft (418) of the motor (414). In some implementations, the output shaft (418), central guide bore (422), drive gear (432), and/or central platform bore (442) may be axially aligned with each other along the central axis (C). For example, the drive gear (432) may include a lower cylindrical bearing portion (not shown) for rotatably engaging the central platform bore (442) to assist in axially aligning the central platform bore (442) with the drive gear (432) and/or output shaft (418). As shown, the platform (440) is rotatably sandwiched between each of the flanges (425) of the frame (410) and the heads (427) of the respective bolts (426) to prevent the platform (440) from being inadvertently dislodged from the output side of the motor housing (416) while permitting rotation of the platform (440) about the central axis (C) relative to the output side of the motor housing (416), as described in greater detail below. In this regard, the spacers (428) may each have a height slightly greater than a thickness of the platform (440) to position the heads (427) of the respective bolts (426) slightly above the top surface of the platform (440) when the bottom surface of the platform (440) is positioned on the flanges (425). While the platform (440) is operatively mounted to the output side of the motor housing (416) via the flanges (425) of the frame (410) in the present example, the platform (440) may alternatively be directly mounted to the output side of the motor housing (416), such as in implementations in which the flanges (425) are omitted.

The gripper head (430) also includes a plurality of gripping assemblies (450), each including a respective driven gear (452) pivotably mounted to the platform (440) via a respective pivot pin (e.g., a shoulder screw) (453) which is fixedly secured to the platform (440) and which defines a respective pivot axis (P) parallel to the central axis (C). The driven gears (452) each include a plurality of driven gear teeth (454) (FIGS. 11A-11C) configured to mesh with drive gear teeth (434) for receiving torque therefrom, as described in greater detail below. The gripping assemblies (450) each further include a respective gripper (456) rotatably mounted to the respective driven gear (452) via a respective fastener (e.g., a button-headed screw) (457) which is fixedly secured to the respective driven gear (452) and offset from the respective pivot axis (P). In this regard, the driven gears (452) are each generally triangular, with the pivot pin (453) positioned at or near a first vertex, the gripper (456) positioned at or near a second vertex adjacent to and counterclockwise from the first vertex, and the driven gear teeth (454) extending toward the second vertex from a third vertex adjacent to and clockwise from the first vertex. In some implementations, a cylindrical bushing or spacer (not shown) may be positioned between each gripper (456) and the respective fastener (457) to promote rotatability of the grippers (456) relative to the respective driven gears (452). In other implementations, the grippers (456) may be fixedly secured to the respective driven gears (452). In any event, the grippers (456) each include a respective grip (e.g., a gripping surface) (458).

In the example shown, the plurality of gripping assemblies (450) includes three gripping assemblies (450) with their respective pivot axes (P) equally spaced radially apart from the central axis (C) and circumferentially spaced apart from each other at equal intervals about the platform (440) such that the grippers (456) surround a tube area (460) and are movable via the respective driven gears (452) between a non-gripping position (FIG. 11A) and a gripping position (FIGS. 11B and 11C). The tube area (460) may be adapted to receive the body (152) of the sample tube (104) and to provide the grips (458) with unobstructed radial access to the body (152) of the sample tube (104) such that the grips (458) may have access to an entire 360° circumference of the body (152) of the sample tube (104), and may include physical features such as the central guide bore (422) that aid in maintaining the position of the sample tube (104) when positioned within the tube area (460) by the routing device (401). The grips (458) are each adapted to contact and grip a sample tube within the tube area (460) when the grippers (456) are rotated toward the tube area (460). In this regard, the grips (458) may be formed of or coated with a flexible material such as a foam or rubber, which may allow for a tighter fit when gripping a body (152) of the sample tube (104). Such materials may also conform to the shape of the body (152) of the sample tube (104) in order to increase the surface area in contact against the gripped tube and may also provide a contact surface having a relatively high friction.

In some implementations, the gripping assemblies (450) may each have a substantially less mass than that of the entire gripper head (430). In addition or alternatively, substantially less frictional resistance may be provided between each gripping assembly (450) and the platform (440) than that provided between the platform (440) and the output side of the motor housing (416). Thus, in the absence of a threshold external force exerted on one or more of the gripping assemblies (450) (e.g., exerted on the grips (458)), the drive gear (432) may be configured to transfer torque from the output shaft (418) of the motor (414) to each of the driven gears (452) for pivoting the driven gears (452) about the respective pivot axes (P) relative to the platform (440), without transferring such torque to the platform (440) such that the platform (440) may remain static relative to the motor housing (416). On the other hand, in the presence of a threshold external force exerted on one or more of the gripping assemblies (450) (e.g., exerted on the grips (458)), the drive gear (432) may be configured to transfer torque from the output shaft (418) of the motor (414) to each of the driven gears (452) which may be restricted from pivoting about the respective pivot axes (P) by the threshold external force, and which may consequently transfer such torque to the platform (440) via pivot pins (453) for rotating the platform (440) about the central axis (C) relative to the motor housing (416).

Rotation of the drive gear (432), such as via rotation of the output shaft (418) of the motor (414), results in activation or actuation of several functional features of the decapping device (400). As shown in FIG. 11A, the sample tube (104) may be at least partially inserted into the tube area (460) with the grippers (456) initially spaced radially outwardly therefrom in a non-gripping position. More particularly, at least a portion of the body (152) of the sample tube (104) may be positioned within the tube area (460) and aligned with the central axis (C). For example, the routing device (401) may fixedly support the cap (150) of the sample tube (104) above the upper guide plate (420) with the body (152) extending downwardly therefrom through the central guide bore (422), which may assist in aligning the body (152) with the central axis (C), and into the tube area (460). Thus, the grips (458) may have unobstructed radial access to the body (152), regardless of the particular orientation of the body (152) about the central axis (C). In this state, the gripper head (430) and the body (152) of the sample tube (104) may each be in a first orientation about the central axis (C).

As shown in FIG. 11B, the motor (414) may be subsequently activated to rotate the output shaft (418) together with the drive gear (432) about the central axis (C) in a first angular direction, such as a clockwise direction, as indicated by the first arrow (A1). Since the gripping assemblies (450) each have a substantially less mass than that of the entire gripper head (430) and/or substantially less frictional resistance than the platform (440), and since no other external forces are exerted on the gripping assemblies (450) in this state, the drive gear (432) may transfer the torque from the output shaft (418) of the motor (414) to each of the driven gears (452) to thereby pivot the driven gears (452) about the respective pivot axes (P) relative to the platform (440) in a second angular direction, such as a counterclockwise direction, as indicated by the second arrows (A2), without transferring such torque to the platform (440). Since the grippers (456) are each offset from the respective pivot axis (P), the pivoting of the driven gears (452) causes a corresponding pivoting of the respective grippers (456) about the respective pivot axis (P) such that the grippers (456) move radially inwardly toward the central axis (C) to a gripping position at which the grippers (456) contact and grip the body (152) of the sample tube (104). In this manner, the set of grippers (456) can grip sample tubes having varying diameters, as the respective grips (458) are also offset from the respective pivot axis (P) and so will have a variable distance of extension into the tube area (460) depending on the range of pivoting of the respective driven gear (452). The set of grippers (456) also function as a centering feature for tubes having varying diameters, as the rotation of opposing grippers (456) occurs simultaneously such that a tube that is positioned off-center will be contacted by one gripper and then pushed toward central axis (C) until contact is made with the second and/or third gripper. In any event, the grippers (456) may apply a secure friction fit against the body (152) of the sample tube (104). In this state, the gripper head (430) and the body (152) of the sample tube (104) may each remain in the first orientation about the central axis (C).

As shown in FIG. 11C, the drive gear (432) may continue to rotate about the central axis (C) in the first angular direction, as indicated by the third arrow (A3), as the set of grippers (456) contact and grip the body (152) of the sample tube (104) such that the body (152) may exert an opposing force against each of the grippers (456). Such opposing forces may increase as the grippers (156) tighten against the body (152) and apply an increasing grip pressure thereto, until the opposing forces reach a threshold sufficient to restrict the driven gears (452) from further pivoting about the respective pivot axes (P) in the second direction. Thus, the driven gears (452) may become static relative to the platform (440), such that the torque transferred to the driven gears (452) by the drive gear (432) is further transferred to the platform (440) via the pivot pins (453). Such torque may be sufficient to rotate the gripper head (430) about the central axis (C) relative to the motor housing (416) in the first direction from the first orientation to a second orientation, as indicated by the fourth arrow (A4). It will be appreciated that the grippers (456) remain in the gripping position and thus continue to apply a secure friction fit against the body (152) of the sample tube (104) during such rotation of the gripper head (430), such that the body (152) may rotate together with the gripper head (430) about the central axis (C) relative to the motor housing (416) from the first orientation to the second orientation. It will be further appreciated that the routing device (401) may restrict the cap (150) of the sample tube (104) from rotating during such rotation of the gripper head (430) and the body (152) of the sample tube (104), such that the body (152) may rotate about the central axis (C) relative to the cap (150) from the first orientation to the second orientation.

The rotation of the gripper head (430) and/or the body (152) about the central axis (C) may provide a discernible indication that a sufficient grip pressure is being applied to the body (152) by the grippers (456) to facilitate removal of the cap (150) from the body (152) by pulling the cap (150) away from the body (152), such as via the routing device (401). In this manner, the set of grippers (456) can limit the grip pressure applied to the body (152) to the force needed to counteract the pulling force on the cap (150), which may reduce the likelihood of damage to the body (152) as a result of unnecessarily high grip pressure. In some implementations, the gear ratio defined by the drive gear (432) and each of the driven gears (452) may be selected to provide a predetermined amount of torque to the driven gears (452) and/or the platform (440) for achieving such a grip pressure.

In cases where the sample tube (104) has a friction fit connection between the cap (150) and the body (152), the motor (414) may be deactivated and the drive gear (432) may be locked to maintain the gripper head (430) and the body (152) in the second orientation while the cap (150) is pulled away from the body (152), such as via the routing device (401), to thereby frictionally disengage the cap (150) from the body (152). Alternatively, the rotation of the gripper head (430) together with the body (152) about the central axis (C) may be synchronized with pulling the cap (150) away from the body (152), such as via the routing device (401), to effect a relative helical movement (e.g., twisting) between the cap (150) and the body (152) to thereby frictionally disengage the cap (150) from the body (152).

In cases where the sample tube (104) has a threaded connection between the cap (150) and the body (152), the rotation of the gripper head (430) together with the body (152) about the central axis (C) may be synchronized with pulling the cap (150) away from the body (152), such as via the routing device (401), to effect a relative helical movement (e.g., twisting/unscrewing) between the cap (150) and the body (152) to thereby threadably disengage the cap (150) from the body (152). Thus, the decapping device (400) may be suitable for removing the cap (150) from the body (152) of a sample tube (104) having a friction fit connection, a threaded connection, or other types of connections therebetween.

After the cap (150) is removed, the routing device (401) may retain the cap (150) and may subsequently dispense the cap (150) into a cap disposal (not shown), which may be a bin, tray, or other surface or receptacle where a plurality of removed caps may collect until they are disposed, and which may be a component or compartment in another device that the decapping device (400) is integrated with, such as an automatic analyzer. After dispensing the cap (150), the routing device (401) (or a different routing device) may retrieve the body (152) of the sample tube (104) from the decapping device (400), and may subsequently return the body (152) to the cartridge (102) and/or transport the body (152) to another device.

Figure 12:
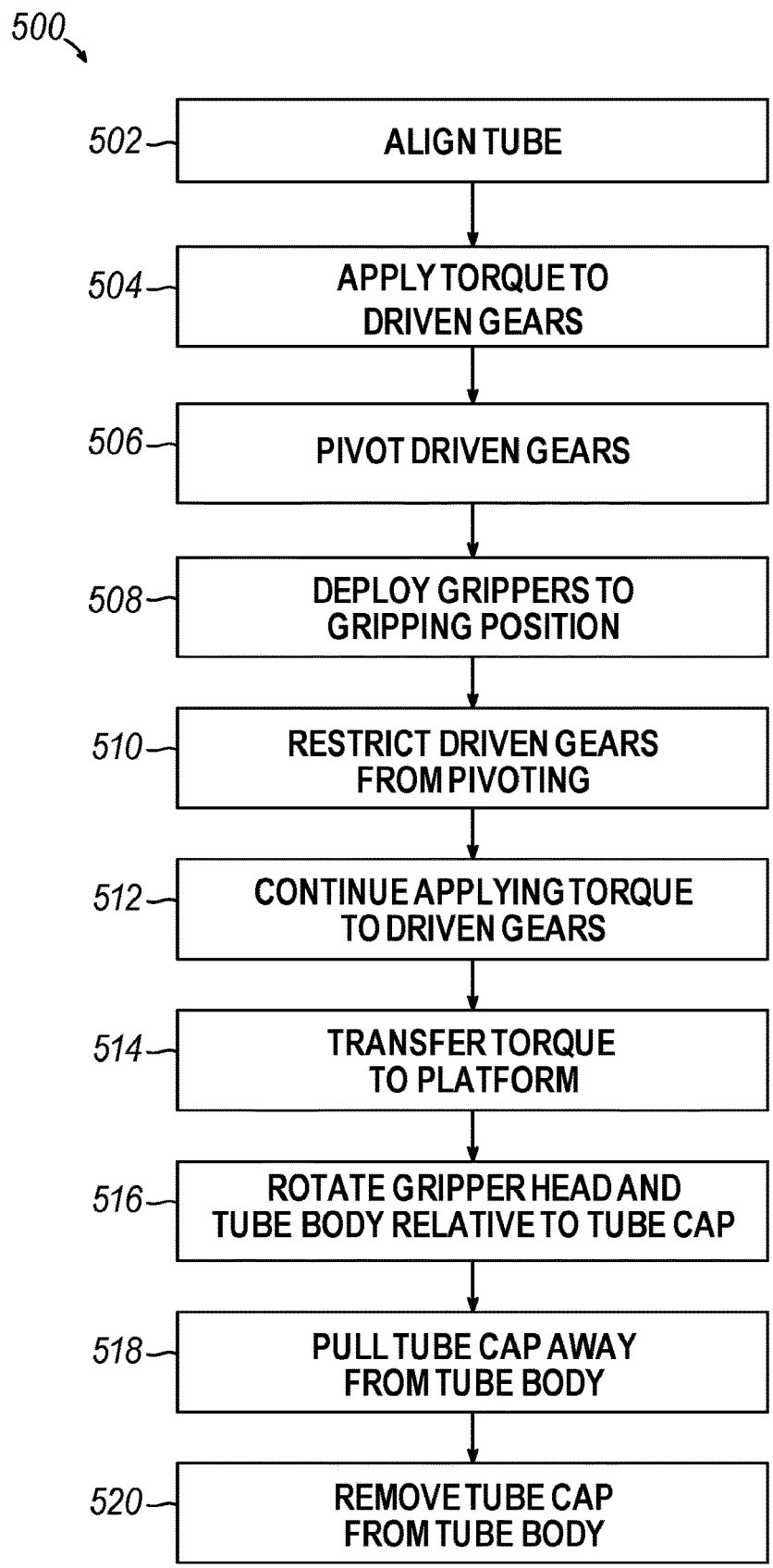
FIG. 12 shows a flowchart of an exemplary set of steps performed while decapping a sample tube with the decapping system of FIG. 9.

While they have been described above in some detail, FIG. 12 shows a flowchart of an exemplary set of steps (500) performed while decapping a sample tube such as the sample tube (104). The sample tube (104) may be aligned (502) within the tube area (460), which may be a manual or automated process, and may include placing the sample tube (104) by gripping the cap (150) thereof, such as via the routing device (401).

The motor (414) may be operated to apply (504) torque to the driven gears (452) to thereby begin pivoting (506) the driven gears (452) about the respective pivot axis (P) such that the grippers (456) are deployed (508) to the gripping position at which the grippers (456) contact and grip the body (152) of the sample tube (104). The location of the gripping position may depend upon factors such as the diameter of the sample tube (104) and the flexibility of the material from which the grip (126) is produced, for example.

The driven gears (452) may then become restricted (510) from further pivoting about the respective pivot axis (P), such as in the manner described above, and the motor (414) may continue to be operated to apply (512) torque to the driven gears (452) so that such torque is transferred (514) from the driven gears (452) to the platform (440) to thereby begin rotating (516) the gripper head (430) together with the body (152) of the sample tube (104) relative to the cap (150) (e.g., the cap (150) may be fixed against rotation at this stage, such as via the routing device (401)). Simultaneously and/or thereafter, the cap (150) may be pulled (518) away from the body (152) of the sample tube (104), such as via the routing device (401), to thereby remove (520) the cap (150) from the body (152).

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus comprising: (a) a tube area defined by the apparatus, wherein the tube area is configured to receive a sample tube therein; (b) a latch mechanism, wherein the latch mechanism is movable between a first position and a second position, wherein the latch mechanism is configured to latch on to a cap of the sample tube in the second position; and (c) a gripper element, wherein the gripper element is movable between a gripping position and a non-gripping position, wherein the gripper element is configured to hold onto the sample tube in the gripping position, wherein the gripper element is configured to move to the non-gripping position in response to the latch mechanism moving to the first position, wherein the gripper element is configured to move to the gripping position in response to the latch mechanism moving to the second position.

Example 2

The apparatus of example 1, further comprising an ejector element, wherein the ejector element is movable between an ejecting position and a non-ejecting position, wherein the ejector element is configured to release the cap from the latch mechanism in the ejecting position.

Example 3

The apparatus of example 2, wherein the apparatus defines a waste chute, wherein the ejector element is configured to dispose the cap in the waste chute in response to moving from the non-ejecting position to the ejecting position.

Example 4

The apparatus of any one or more of examples 2 through 3, wherein the ejector element is configured to move to the ejecting position in response to the latch mechanism moving to the first position, wherein the ejector element is configured to move to the non-ejecting position in response to the latch mechanism moving to the second position Example 5

The apparatus of any one or more of examples 1 through 4, further comprising a motor, wherein the motor is configured to move the latch mechanism between the first position and the second position.

Example 6

The apparatus of any one or more of examples 1 through 5, further comprising a frame, wherein the frame defines the tube area, wherein the latch mechanism is movably coupled to the frame.

Example 7

The apparatus of example 6, further comprising a retractor element, wherein the retractor element is movably coupled with the frame and rests upon the latch mechanism in order to move with the latch mechanism between the first position and the second position, wherein the retractor element is configured to move the gripper element to the gripping position in response to the latch mechanism moving to the second position, wherein the retractor element is configured to move the gripper element to the non-gripping position in response to the latch mechanism moving to the first position.

Example 8

A method comprising: (a) positioning a sample tube in a tube area defined by an automatic decapper; (b) actuating a motor of the automatic decapper to move a latch mechanism of the automatic decapper from a first position to a second position; (c) in response to moving the latch mechanism from the first position to the second position: (i) latching on to a cap of the sample tube with the latch mechanism, and (ii) actuating a gripper element of the automatic decapper to hold the sample tube; (d) actuating the motor of the automatic decapper to move the latch mechanism from the second position to the first position; and (e) in response to moving the latch mechanism from the second position to the first position: (i) removing the cap from the sample tube with the latch mechanism, and (ii) actuating the gripper element to release the sample tube.

Example 9

The method of example 8, further comprising actuating an ejector element of the automatic decapper to eject the cap from the latch mechanism in response to moving the latch mechanism from the second position to the first position.

Example 10

The method of any one or more of examples 8 through 9, further comprising centering the sample tube within the tube area prior to moving the latch mechanism from a first position to a second position.

Example 11

The method of example 10, further comprising actuating a centering feature of the automatic decapper to center the sample tube within the tube area, wherein the centering feature is adapted to center sample tubes of a variety of diameters Example 12

The method of example 11, further comprising maintaining a static position and orientation of the cap within the latch mechanism until the cap is ejected by an ejector element of the automatic decapper.

Example 13

The method of any one or more of examples 8 through 12, wherein the gripper element comprises a set of grippers and further comprising rotating the set of grippers to hold the sample tube.

Example 14

The method of any one or more of examples 8 through 13, wherein the gripper element comprises a torque limiter and further comprising rotating the set of grippers in accordance with the torque limiter to enable the gripper element to hold sample tubes of varying diameters without damaging the sample tube.

Example 15

An apparatus comprising: (a) a frame portion comprising a motor and a tube area; (b) a latch mechanism positioned within the frame portion, wherein the latch mechanism may be extended to a destination position and retracted to an origin position within the frame portion by operation of the motor, and wherein the latch mechanism is positioned to: (i) engage with a sample tube in the tube area by latching onto a cap of the sample tube when the latch mechanism is extended to the destination position, and (ii) remove the cap from the sample tube when the latch mechanism is retracted to the origin position; (c) a retractor portion coupled to the frame portion and positioned to engage with the latch mechanism; (d) a tube gripping device positioned to be activated by the retractor portion when the latch mechanism is extended in order to engage and grip a body of the sample tube; and (e) an ejector positioned to be activated by the frame portion when the latch mechanism is retracted in order to cause an ejector arm of the ejector to extend and eject the cap from the latch mechanism.

Example 16

The apparatus of example 15, further comprising: (a) a centering feature positioned on the frame portion to cause the sample tube to be centered within the tube area, wherein the centering feature is adapted to center sample tubes of a variety of diameters; and (b) an orientation feature of the latch mechanism positioned to cause the cap to substantially maintain a static position and orientation within the latch mechanism between removal from the sample tube and ejection from the latch mechanism.

Example 17

The apparatus of any one or more of examples 15 through 16, further comprising a tube positioning device operable to: (i) maneuver the sample tube into the tube area, and (ii) maneuver the sample tube out of the tube area.

Example 18

The apparatus of any one or more of examples 15 through 17, wherein: (i) the retractor portion is movably coupled with the frame portion; (ii) the tube gripping device is positioned on the frame portion, and comprises a rotation bolt positioned within a diagonal slot of the retractor portion; and (iii) the ejector is positioned in the latch mechanism and comprises a contact portion positioned to be displaced by the frame portion as it retracts to cause the ejection arm to extend.

Example 19

The apparatus of any one or more of examples 15 through 18, wherein the latch mechanism comprises a set of latch arms, and wherein each of the set of latch arms comprises a contoured portion positioned to cause that latch to rotate and receive the cap during extension of the latch mechanism and a catch portion positioned to hold a bottom rim of the cap upon completion of extension of the latch mechanism.

Example 20

The apparatus of any one or more of examples 15 through 19, wherein the tube gripping device comprises a set of grippers, and wherein each of the set of grippers is rotatably coupled with the frame portion and slideably coupled with a diagonal slot of the retractor portion so that the extension of the retractor portion causes: (i) a first gripper of the set of grippers to rotate from a neutral angle, clockwise, to engage the body, and (ii) a second gripper of the set of grippers to rotate from the neutral angle, counter-clockwise, to engage the body.

Example 21

The apparatus of example 20, wherein each of the set of grippers comprises a torque limiter that allows the set of grippers to rotate and grip sample tube bodies of varying diameters without damaging the sample tube bodies.

Example 22

The apparatus of any one or more of examples 20 through 21, wherein each of the set of grippers is coupled with the retractor portion so that the retraction of the retractor portion causes: (i) the first gripper to rotate counter-clockwise to disengage the body and return to the neutral angle, and (ii) the second gripper to rotate clockwise to disengage the body and return to the neutral angle.

Example 23

The apparatus of any one or more of examples 15 through 22, wherein the ejector arm comprises an ejector arm that is positioned within the latch mechanism to receive to the cap when the latch mechanism latches onto the cap.

Example 24

The apparatus of example 23, wherein the latch mechanism comprises: (i) a slot adapted to receive the ejector and a rotatable coupling to the ejector, and (ii) an ejector port from which the ejector arm extends when the latch mechanism returns to the origin position.

Example 25

A method comprising: (a) positioning a sample tube in a tube area of an automatic decapper; (b) operating a motor of the automatic decapper to extend a latch mechanism from an origin position within a frame portion of the automatic decapper; (c) engaging the latch mechanism of the automatic decapper with the sample tube by latching onto a cap of the sample tube as a result of extending the latch mechanism; (d) gripping a body of the sample tube with a tube gripping device of the automatic decapper as a result of extending the retractor portion, wherein the retractor portion is engaged with the latch mechanism and extends with the retractor portion; (e) operating a motor of the automatic decapper to retract the latch mechanism to the origin position; (f) removing the cap from the sample tube with the latch mechanism as a result of retracting the latch mechanism while the tube gripping device holds the sample tube in place; and (g) using an ejector that is activated as a result of retracting the latch mechanism to the origin position to cause an ejector arm of the ejector to extend and eject the cap from the latch mechanism.

Example 26

The method of example 25, wherein the tube gripping device comprises a set of grippers, and wherein each of the set of grippers is rotatably coupled with the frame portion and slideably coupled with a diagonal slot of the retractor portion, further comprising gripping the body of the sample tube by: (a) rotating a first gripper of the set of grippers from a neutral angle, clockwise, to engage the body as a result of the retractor portion extending; and (b) rotating a second gripper of the gripping device from the neutral angle, counter-clockwise, to engage the body as a result of the retractor portion extending.

Example 27

The method of any one or more of examples 25 through 26, further comprising: (a) using a centering feature to center the sample tube within the tube area, wherein the centering feature is adapted to center sample tubes of a variety of diameters; and (b) using an orientation feature to cause the cap to substantially maintain a static position and orientation within the latch mechanism between removal from the sample tube and ejection from the latch mechanism.

Example 28

An apparatus comprising: (a) a tube area configured to receive a sample tube therein; (b) a drive gear; and (c) a gripper head, wherein the gripper head includes: (i) a platform rotatable about a central axis, (ii) a plurality of driven gears pivotably coupled to the rotatable platform via respective pivot pins and configured to mesh with the drive gear for receiving torque therefrom, and (iii) a plurality of gripper elements movable between a gripping position and a non-gripping position, wherein the gripper elements are configured to hold onto the sample tube in the gripping position, wherein the gripper elements are configured to move between the gripping and non-gripping positions in response to the driven gears pivoting relative to the rotatable platform about the respective pivot pins.

Example 29

The apparatus of example 28, wherein each of the gripper elements of the plurality of gripper elements is coupled to a respective driven gear of the plurality of driven gears and is offset from the respective pivot pin.

Example 30

The apparatus of example 29, where each of the gripper elements of the plurality of gripper elements is rotatably coupled to the respective driven gear.

Example 31

The apparatus of any one or more of examples 28 through 30, wherein the pivot pins are equally spaced radially from the central axis.

Example 32

The apparatus of any one or more of examples 28 through 31, wherein the pivot pins are circumferentially spaced apart from each other at equal intervals about the rotatable platform.

Example 33

The apparatus of any one or more of examples 28 through 32, wherein the rotatable platform includes a central bore configured to rotatably receive the drive gear.

Example 34

The apparatus of any one or more of examples 28 through 33, further comprising a motor having an output shaft, wherein the drive gear is fixedly coupled to the output shaft.

Example 35

The apparatus of example 34, wherein the rotatable platform is rotatably mounted to a motor housing of the motor.

Example 36

The apparatus of any one or more of examples 28 through 35, wherein the driven gears are configured to transfer the torque received from the drive gear to the rotatable platform in response to a threshold force being applied to the gripper elements sufficient to prevent the driven gears from pivoting relative to the rotatable platform about the respective pivot pins.

IV. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. An apparatus comprising:
   (a) a tube area defined by the apparatus, wherein the tube area is configured to receive a sample tube therein;
   (b) a latch mechanism, wherein the latch mechanism is movable between a first position and a second position, wherein the latch mechanism is configured to latch on to a cap of the sample tube in the second position; and
   (c) a gripper element, wherein the gripper element is movable between a gripping position and a non-gripping position, wherein the gripper element is configured to hold onto the sample tube in the gripping position, wherein the gripper element is configured to move to the non-gripping position in response to the latch mechanism moving to the first position, wherein the gripper element is configured to move to the gripping position in response to the latch mechanism moving to the second position;
- (d) a frame, wherein the frame defines the tube area, wherein the latch mechanism is movably coupled to the frame; and
- (e) a retractor element, wherein the retractor element is movably coupled with the frame and rests upon the latch mechanism in order to move with the latch mechanism between the first position and the second position, wherein the retractor element is configured to move the gripper element to the gripping position in response to the latch mechanism moving to the second position, wherein the retractor element is configured to move the gripper element to the non-gripping position in response to the latch mechanism moving to the first position, and wherein the retractor element is configured to be disengaged from the latch mechanism and instead rest upon a portion of the gripper element when the latch mechanism is in the second position.

2. The apparatus of claim 1, further comprising an ejector element, wherein the ejector element is movable between an ejecting position and a non-ejecting position, wherein the ejector element is configured to release the cap from the latch mechanism in the ejecting position.

3. The apparatus of claim 2, wherein the apparatus defines a waste chute, wherein the ejector element is configured to dispose the cap in the waste chute in response to moving from the non-ejecting position to the ejecting position.

4. The apparatus of claim 2, wherein the ejector element is configured to move to the ejecting position in response to the latch mechanism moving to the first position, wherein the ejector element is configured to move to the non-ejecting position in response to the latch mechanism moving to the second position.

5. The apparatus of claim 1, further comprising a motor, wherein the motor is configured to move the latch mechanism between the first position and the second position.

6. The apparatus of claim 1, wherein the gripper element includes a bolt, wherein the retractor element is configured to rest upon the bolt of the gripper element when the latch mechanism is in the second position.

7. The apparatus of claim 1, wherein the latch mechanism is configured to carry the retractor element during movement of the latch mechanism from the first position to an intermediate position between the first and second positions, and wherein the portion of the gripper element is configured to carry the retractor element during movement of the latch mechanism from the intermediate position to the second position.

8. A method comprising:
- (a) positioning a sample tube in a tube area defined by an automatic decapper;
- (b) actuating a motor of the automatic decapper to move a latch mechanism of the automatic decapper from a first position to a second position;
- (c) in response to moving the latch mechanism from the first position to the second position:
  - (i) latching on to a cap of the sample tube with the latch mechanism, and
  - (ii) actuating a gripper element of the automatic decapper to hold the sample tube by disengaging a retractor element of the automatic decapper from the latch mechanism such that the retractor element rests on a portion of the gripper element;
- (d) actuating the motor of the automatic decapper to move the latch mechanism from the second position to the first position; and
- (e) in response to moving the latch mechanism from the second position to the first position:
  - (i) removing the cap from the sample tube with the latch mechanism, and
  - (ii) actuating the gripper element to release the sample tube by engaging the latch mechanism with the retractor element such that the retractor element rests on the latch mechanism.

9. The method of claim 8, further comprising actuating an ejector element of the automatic decapper to eject the cap from the latch mechanism in response to moving the latch mechanism from the second position to the first position.

10. The method of claim 8, further comprising centering the sample tube within the tube area prior to moving the latch mechanism from a first position to a second position.

11. The method of claim 10, further comprising actuating a centering feature of the automatic decapper to center the sample tube within the tube area, wherein the centering feature is adapted to center sample tubes of a variety of diameters.

12. The method of claim 11, further comprising maintaining a static position and orientation of the cap within the latch mechanism until the cap is ejected by an ejector element of the automatic decapper.

13. The method of claim 8, wherein the gripper element comprises a set of grippers and further comprising rotating the set of grippers to hold the sample tube.

14. The method of claim 8, wherein the gripper element comprises a torque limiter and further comprising rotating the set of grippers in accordance with the torque limiter to enable the gripper element to hold sample tubes of varying diameters without damaging the sample tube.

15. An apparatus comprising:
- (a) a tube area configured to receive a sample tube therein;
- (b) a drive gear; and
- (c) a gripper head, wherein the gripper head includes:
  - (i) a platform rotatable about a central axis,
  - (ii) a plurality of driven gears pivotably coupled to the rotatable platform via respective pivot pins and configured to mesh with the drive gear for receiving torque therefrom, and
  - (iii) a plurality of gripper elements movable between a gripping position and a non-gripping position, wherein the gripper elements are configured to hold onto the sample tube in the gripping position, wherein the gripper elements are configured to move between the gripping and non-gripping positions in response to the driven gears pivoting relative to the rotatable platform about the respective pivot pins, wherein the driven gears are configured to transfer the torque received from the drive gear to the rotatable platform in response to a threshold force being applied to the gripper elements sufficient to prevent the driven gears from pivoting relative to the rotatable platform about the respective pivot pins, wherein, in response to a force less than the threshold force being applied to the gripper elements, the driven gears are configured to pivot relative to the rotatable platform about the respective pivot pins via the torque received from the drive gear while the platform is configured to remain static.

16. The apparatus of claim 15, wherein each of the gripper elements of the plurality of gripper elements is coupled to a respective driven gear of the plurality of driven gears and is offset from the respective pivot pin.

17. The apparatus of claim 16, where each of the gripper elements of the plurality of gripper elements is rotatably coupled to the respective driven gear.

18. The apparatus of claim 15, wherein the pivot pins are equally spaced radially from the central axis.

19. The apparatus of claim 15, wherein the pivot pins are circumferentially spaced apart from each other at equal intervals about the rotatable platform.

20. The apparatus of claim 15, wherein the rotatable platform includes a central bore configured to rotatably receive the drive gear.

21. The apparatus of claim 15, further comprising a motor having an output shaft, wherein the drive gear is fixedly coupled to the output shaft.

22. The apparatus of claim 21, wherein the rotatable platform is rotatably mounted to a motor housing of the motor.

23. The apparatus of claim 15, wherein each driven gear of the plurality of driven gears is generally triangular such that each driven gear of the plurality of driven gears includes a first vertex, a second vertex adjacent to and counterclockwise from the first vertex, and a third vertex adjacent to and clockwise from the first vertex, wherein each respective pivot pin is positioned at or near the first vertex of the corresponding driven gear, wherein each respective gripper element is coupled to the corresponding driven gear at or near the second vertex, and wherein each driven gear of the plurality of driven gears includes a plurality of teeth extending toward the second vertex from the third vertex.

* * * * *